(12) United States Patent
Marchetti et al.

(10) Patent No.: US 12,147,647 B2
(45) Date of Patent: Nov. 19, 2024

(54) ARTIFICIAL INTELLIGENCE ASSISTED EVALUATIONS AND USER INTERFACE FOR SAME

(71) Applicant: Palantir Technologies Inc., Denver, CO (US)

(72) Inventors: Galen Marchetti, Stow, OH (US); Henrique Valer, São Paulo (BR); Pedro Sanzovo, Brasil Vinhedo (BR)

(73) Assignee: Palantir Technologies Inc., Denver, CO (US)

( * ) Notice: Subject to any disclaimer, the term of this patent is extended or adjusted under 35 U.S.C. 154(b) by 523 days.

(21) Appl. No.: 17/445,037

(22) Filed: Aug. 13, 2021

(65) Prior Publication Data

US 2021/0373721 A1 Dec. 2, 2021

Related U.S. Application Data

(63) Continuation of application No. 16/116,629, filed on Aug. 29, 2018, now Pat. No. 11,119,630.

(60) Provisional application No. 62/686,994, filed on Jun. 19, 2018.

(51) Int. Cl.
  *G06F 3/0482* (2013.01)
  *G06N 5/04* (2023.01)
  *G06Q 10/0635* (2023.01)

(52) U.S. Cl.
  CPC ............. *G06F 3/0482* (2013.01); *G06N 5/04* (2013.01); *G06Q 10/0635* (2013.01)

(58) Field of Classification Search
  CPC .......................... G06Q 10/0635; G06F 3/0482
  See application file for complete search history.

(56) References Cited

U.S. PATENT DOCUMENTS

| | | |
|---|---|---|
| 5,109,399 A | 4/1992 | Thompson |
| 5,329,108 A | 7/1994 | Lamoure |
| 5,670,987 A | 9/1997 | Doi et al. |
| 5,781,704 A | 7/1998 | Rossmo |
| 5,798,769 A | 8/1998 | Chiu et al. |
| 5,819,226 A | 10/1998 | Gopinathan et al. |
| 5,845,300 A | 12/1998 | Comer |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

US 8,712,906 B1, 04/2014, Sprague et al. (withdrawn)

(Continued)

*Primary Examiner* — Andre D Boyce
(74) *Attorney, Agent, or Firm* — Knobbe, Martens, Olson & Bear, LLP

(57) ABSTRACT

Systems and methods are disclosed herein for reducing a risk of associating with a client that may engage in illegal activity. A system accesses data associated with an entity for a given context, applies a plurality of AI models to the data based on the context to generate a plurality of AI assessments. Data for showing risk factors, assessments of the risk factors, and data for evaluating risk factors can be transmitted for rendering in a user interface in a display device. Analyst feedback can be received and used to update the AI models.

20 Claims, 10 Drawing Sheets

(56) References Cited

U.S. PATENT DOCUMENTS

| | | | |
|---|---|---|---|
| 5,892,900 | A | 4/1999 | Ginter et al. |
| 6,057,757 | A | 5/2000 | Arrowsmith et al. |
| 6,091,956 | A | 7/2000 | Hollenberg |
| 6,094,643 | A | 7/2000 | Anderson et al. |
| 6,161,098 | A | 12/2000 | Wallman |
| 6,219,053 | B1 | 4/2001 | Tachibana et al. |
| 6,232,971 | B1 | 5/2001 | Haynes |
| 6,247,019 | B1 | 6/2001 | Davies |
| 6,279,018 | B1 | 8/2001 | Kudrolli et al. |
| 6,341,310 | B1 | 1/2002 | Leshem et al. |
| 6,366,933 | B1 | 4/2002 | Ball et al. |
| 6,369,835 | B1 | 4/2002 | Lin |
| 6,430,305 | B1 | 8/2002 | Decker |
| 6,456,997 | B1 | 9/2002 | Shukla |
| 6,549,944 | B1 | 4/2003 | Weinberg et al. |
| 6,560,620 | B1 | 5/2003 | Ching |
| 6,567,936 | B1 | 5/2003 | Yang et al. |
| 6,581,068 | B1 | 6/2003 | Bensoussan et al. |
| 6,594,672 | B1 | 7/2003 | Lampson et al. |
| 6,631,496 | B1 | 10/2003 | Li et al. |
| 6,642,945 | B1 | 11/2003 | Sharpe |
| 6,714,936 | B1 | 3/2004 | Nevin, III |
| 6,775,675 | B1 | 8/2004 | Nwabueze et al. |
| 6,820,135 | B1 | 11/2004 | Dingman |
| 6,828,920 | B2 | 12/2004 | Owen et al. |
| 6,839,745 | B1 | 1/2005 | Dingari et al. |
| 6,877,137 | B1 | 4/2005 | Rivette et al. |
| 6,976,210 | B1 | 12/2005 | Silva et al. |
| 6,978,419 | B1 | 12/2005 | Kantrowitz |
| 6,980,984 | B1 | 12/2005 | Huffman et al. |
| 6,985,950 | B1 | 1/2006 | Hanson et al. |
| 7,036,085 | B2 | 4/2006 | Barros |
| 7,043,702 | B2 | 5/2006 | Chi et al. |
| 7,055,110 | B2 | 5/2006 | Kupka et al. |
| 7,139,800 | B2 | 11/2006 | Bellotti et al. |
| 7,158,878 | B2 | 1/2007 | Rasmussen et al. |
| 7,162,475 | B2 | 1/2007 | Ackerman |
| 7,168,039 | B2 | 1/2007 | Bertram |
| 7,171,427 | B2 | 1/2007 | Witowski et al. |
| 7,181,438 | B1 | 2/2007 | Szabo |
| 7,269,786 | B1 | 9/2007 | Malloy et al. |
| 7,278,105 | B1 | 10/2007 | Kitts |
| 7,290,698 | B2 | 11/2007 | Poslinski et al. |
| 7,333,998 | B2 | 2/2008 | Heckerman et al. |
| 7,370,047 | B2 | 5/2008 | Gorman |
| 7,373,669 | B2 | 5/2008 | Eisen |
| 7,379,811 | B2 | 5/2008 | Rasmussen et al. |
| 7,379,903 | B2 | 5/2008 | Caballero et al. |
| 7,426,654 | B2 | 9/2008 | Adams et al. |
| 7,451,397 | B2 | 11/2008 | Weber et al. |
| 7,454,466 | B2 | 11/2008 | Bellotti et al. |
| 7,467,375 | B2 | 12/2008 | Tondreau et al. |
| 7,487,139 | B2 | 2/2009 | Fraleigh et al. |
| 7,502,786 | B2 | 3/2009 | Liu et al. |
| 7,525,422 | B2 | 4/2009 | Bishop et al. |
| 7,529,727 | B2 | 5/2009 | Arning et al. |
| 7,558,677 | B2 | 7/2009 | Jones |
| 7,571,109 | B2 * | 8/2009 | Fawls ............... G06Q 10/06 705/7.41 |
| 7,574,409 | B2 | 8/2009 | Patinkin |
| 7,574,428 | B2 | 8/2009 | Leiserowitz et al. |
| 7,579,965 | B2 | 8/2009 | Bucholz |
| 7,596,285 | B2 | 9/2009 | Brown et al. |
| 7,614,006 | B2 | 11/2009 | Molander |
| 7,617,232 | B2 | 11/2009 | Gabbert et al. |
| 7,620,628 | B2 | 11/2009 | Kapur et al. |
| 7,627,812 | B2 | 12/2009 | Chamberlain et al. |
| 7,634,717 | B2 | 12/2009 | Chamberlain et al. |
| 7,703,021 | B1 | 4/2010 | Flam |
| 7,712,049 | B2 | 5/2010 | Williams et al. |
| 7,716,077 | B1 | 5/2010 | Mikurak |
| 7,725,530 | B2 | 5/2010 | Sah et al. |
| 7,725,547 | B2 | 5/2010 | Albertson et al. |
| 7,730,082 | B2 | 6/2010 | Sah et al. |
| 7,730,109 | B2 | 6/2010 | Rohrs et al. |
| 7,756,843 | B1 | 7/2010 | Palmer |
| 7,770,100 | B2 | 8/2010 | Chamberlain et al. |
| 7,783,658 | B1 | 8/2010 | Bayliss |
| 7,805,457 | B1 | 9/2010 | Viola et al. |
| 7,809,703 | B2 | 10/2010 | Balabhadrapatruni et al. |
| 7,814,102 | B2 | 10/2010 | Miller et al. |
| 7,818,658 | B2 | 10/2010 | Chen |
| 7,870,493 | B2 | 1/2011 | Pall et al. |
| 7,894,984 | B2 | 2/2011 | Rasmussen et al. |
| 7,899,611 | B2 | 3/2011 | Downs et al. |
| 7,899,796 | B1 | 3/2011 | Borthwick et al. |
| 7,917,376 | B2 | 3/2011 | Bellin et al. |
| 7,920,963 | B2 | 4/2011 | Jouline et al. |
| 7,933,862 | B2 | 4/2011 | Chamberlain et al. |
| 7,941,321 | B2 | 5/2011 | Greenstein et al. |
| 7,962,281 | B2 | 6/2011 | Rasmussen et al. |
| 7,962,495 | B2 | 6/2011 | Jain et al. |
| 7,962,848 | B2 | 6/2011 | Bertram |
| 7,970,240 | B1 | 6/2011 | Chao et al. |
| 7,971,150 | B2 | 6/2011 | Raskutti et al. |
| 7,984,374 | B2 | 7/2011 | Caro et al. |
| 8,001,465 | B2 | 8/2011 | Kudrolli et al. |
| 8,001,482 | B2 | 8/2011 | Bhattiprolu et al. |
| 8,010,545 | B2 | 8/2011 | Stefik et al. |
| 8,015,487 | B2 | 9/2011 | Roy et al. |
| 8,024,778 | B2 | 9/2011 | Cash et al. |
| 8,036,632 | B1 | 10/2011 | Cona et al. |
| 8,036,971 | B2 | 10/2011 | Aymeloglu et al. |
| 8,046,283 | B2 | 10/2011 | Burns |
| 8,046,362 | B2 | 10/2011 | Bayliss |
| 8,054,756 | B2 | 11/2011 | Chand et al. |
| 8,103,543 | B1 | 1/2012 | Zwicky |
| 8,134,457 | B2 | 3/2012 | Velipasalar et al. |
| 8,135,679 | B2 | 3/2012 | Bayliss |
| 8,135,719 | B2 | 3/2012 | Bayliss |
| 8,145,703 | B2 | 3/2012 | Frishert et al. |
| 8,185,819 | B2 | 5/2012 | Sah et al. |
| 8,214,361 | B1 | 7/2012 | Sandler et al. |
| 8,214,490 | B1 | 7/2012 | Vos et al. |
| 8,214,764 | B2 | 7/2012 | Gemmell et al. |
| 8,225,201 | B2 | 7/2012 | Michael |
| 8,229,902 | B2 | 7/2012 | Vishniac et al. |
| 8,229,947 | B2 | 7/2012 | Fujinaga |
| 8,230,333 | B2 | 7/2012 | Decherd et al. |
| 8,266,168 | B2 | 9/2012 | Bayliss |
| 8,271,461 | B2 | 9/2012 | Pike et al. |
| 8,280,880 | B1 | 10/2012 | Aymeloglu et al. |
| 8,290,838 | B1 | 10/2012 | Thakur et al. |
| 8,290,942 | B2 | 10/2012 | Jones et al. |
| 8,301,464 | B1 | 10/2012 | Cave et al. |
| 8,301,904 | B1 | 10/2012 | Gryaznov |
| 8,302,855 | B2 | 11/2012 | Ma et al. |
| 8,312,367 | B2 | 11/2012 | Foster |
| 8,312,546 | B2 | 11/2012 | Alme |
| 8,321,943 | B1 | 11/2012 | Walters et al. |
| 8,347,398 | B1 | 1/2013 | Weber |
| 8,352,881 | B2 | 1/2013 | Champion et al. |
| 8,368,695 | B2 | 2/2013 | Howell et al. |
| 8,397,171 | B2 | 3/2013 | Klassen et al. |
| 8,412,707 | B1 | 4/2013 | Mianji |
| 8,447,674 | B2 | 5/2013 | Choudhuri et al. |
| 8,447,722 | B1 | 5/2013 | Ahuja et al. |
| 8,452,790 | B1 | 5/2013 | Mianji |
| 8,463,036 | B1 | 6/2013 | Ramesh et al. |
| 8,473,454 | B2 | 6/2013 | Evanitsky et al. |
| 8,484,115 | B2 | 7/2013 | Aymeloglu et al. |
| 8,484,168 | B2 | 7/2013 | Bayliss |
| 8,489,331 | B2 | 7/2013 | Kopf et al. |
| 8,489,641 | B1 | 7/2013 | Seefeld et al. |
| 8,495,077 | B2 | 7/2013 | Bayliss |
| 8,498,969 | B2 | 7/2013 | Bayliss |
| 8,498,984 | B1 | 7/2013 | Hwang et al. |
| 8,514,082 | B2 | 8/2013 | Cova et al. |
| 8,515,207 | B2 | 8/2013 | Chau |
| 8,554,579 | B2 | 10/2013 | Tribble et al. |
| 8,554,653 | B2 | 10/2013 | Falkenborg et al. |
| 8,554,709 | B2 | 10/2013 | Goodson et al. |
| 8,560,413 | B1 | 10/2013 | Quarterman |
| 8,577,911 | B1 | 11/2013 | Stepinski et al. |

(56) References Cited

U.S. PATENT DOCUMENTS

| | | |
|---|---|---|
| 8,589,273 B2 | 11/2013 | Creeden et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,666,861 B2 | 3/2014 | Li et al. |
| 8,676,857 B1 | 3/2014 | Adams et al. |
| 8,682,764 B2* | 3/2014 | Love .................. G06Q 40/08 707/999.001 |
| 8,688,573 B1 | 4/2014 | Ruknoic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,798,354 B1 | 8/2014 | Bunzel et al. |
| 8,799,799 B1 | 8/2014 | Cervelli et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,032,531 B1 | 5/2015 | Scorvo et al. |
| 9,043,696 B1 | 5/2015 | Meiklejohn et al. |
| 9,043,894 B1 | 5/2015 | Dennison et al. |
| 9,100,428 B1 | 8/2015 | Visbal |
| 9,129,219 B1 | 9/2015 | Robertson et al. |
| 9,609,011 B2 | 3/2017 | Muddu et al. |
| 9,721,296 B1 | 8/2017 | Chrapko |
| 9,898,509 B2 | 2/2018 | Saperstein et al. |
| 11,119,630 B1 | 9/2021 | Marchetti et al. |
| 11,842,354 B1* | 12/2023 | Chamberlain ........ G06F 16/951 |
| 2001/0027424 A1 | 10/2001 | Torigoe |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0103747 A1* | 8/2002 | Lawrence .............. G06Q 40/03 705/38 |
| 2002/0116120 A1 | 8/2002 | Ruiz et al. |
| 2002/0138407 A1* | 9/2002 | Lawrence .............. G06Q 40/04 705/38 |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0039948 A1 | 2/2003 | Donahue |
| 2003/0097330 A1 | 5/2003 | Hillmer et al. |
| 2003/0126102 A1 | 7/2003 | Borthwick |
| 2003/0144868 A1 | 7/2003 | MacIntyre et al. |
| 2003/0163352 A1 | 8/2003 | Surpin et al. |
| 2003/0225687 A1* | 12/2003 | Lawrence .............. G06Q 40/03 705/38 |
| 2003/0225755 A1 | 12/2003 | Iwayama et al. |
| 2003/0229848 A1 | 12/2003 | Arend et al. |
| 2004/0006533 A1* | 1/2004 | Lawrence .............. G06Q 40/08 705/38 |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1 | 6/2004 | Yue |
| 2004/0126840 A1 | 7/2004 | Cheng et al. |
| 2004/0133508 A1* | 7/2004 | Lawrence .............. G06Q 40/00 705/38 |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0236688 A1 | 11/2004 | Bozeman |
| 2004/0260702 A1 | 12/2004 | Cragun et al. |
| 2005/0010472 A1 | 1/2005 | Quatse et al. |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0044037 A1* | 2/2005 | Lawrence .......... G06Q 20/4016 705/38 |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Di Franco et al. |
| 2005/0133588 A1 | 6/2005 | Williams |
| 2005/0149455 A1 | 7/2005 | Bruesewitz et al. |
| 2005/0154628 A1 | 7/2005 | Eckart et al. |
| 2005/0154769 A1 | 7/2005 | Eckart et al. |
| 2005/0162523 A1 | 7/2005 | Darrell et al. |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0222928 A1 | 10/2005 | Steier et al. |
| 2005/0246327 A1 | 11/2005 | Yeung et al. |
| 2005/0251786 A1 | 11/2005 | Citron et al. |
| 2006/0002387 A1* | 1/2006 | Lawrence .............. G06Q 40/00 370/389 |
| 2006/0004719 A1* | 1/2006 | Lawrence .......... H04L 63/1433 |
| 2006/0004814 A1* | 1/2006 | Lawrence .............. G06F 16/22 |
| 2006/0004866 A1* | 1/2006 | Lawrence .......... G06Q 10/0635 715/255 |
| 2006/0026120 A1 | 2/2006 | Carolan et al. |
| 2006/0026170 A1 | 2/2006 | Kreitler et al. |
| 2006/0036560 A1 | 2/2006 | Fogel |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0203337 A1 | 9/2006 | White |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0061259 A1 | 3/2007 | Zoldi et al. |
| 2007/0078832 A1 | 4/2007 | Ott et al. |
| 2007/0083541 A1 | 4/2007 | Fraleigh et al. |
| 2007/0106582 A1 | 5/2007 | Baker et al. |

(56) References Cited

U.S. PATENT DOCUMENTS

| | | |
|---|---|---|
| 2007/0143851 A1* | 6/2007 | Nicodemus ......... H04L 63/1433 |
| | | 726/4 |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0174760 A1 | 7/2007 | Chamberlain et al. |
| 2007/0185867 A1 | 8/2007 | Maga |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0239606 A1 | 10/2007 | Eisen |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294200 A1 | 12/2007 | Au |
| 2007/0294643 A1 | 12/2007 | Kyle |
| 2008/0040684 A1 | 2/2008 | Crump |
| 2008/0046481 A1 | 2/2008 | Gould et al. |
| 2008/0051989 A1 | 2/2008 | Welsh |
| 2008/0052142 A1 | 2/2008 | Bailey et al. |
| 2008/0069081 A1 | 3/2008 | Chand et al. |
| 2008/0077597 A1 | 3/2008 | Butler |
| 2008/0077642 A1 | 3/2008 | Carbone et al. |
| 2008/0082374 A1 | 4/2008 | Kennis et al. |
| 2008/0103798 A1 | 5/2008 | Domenikos et al. |
| 2008/0103996 A1 | 5/2008 | Forman et al. |
| 2008/0104019 A1 | 5/2008 | Nath |
| 2008/0126951 A1 | 5/2008 | Sood et al. |
| 2008/0133567 A1 | 6/2008 | Ames et al. |
| 2008/0140576 A1 | 6/2008 | Lewis et al. |
| 2008/0148398 A1 | 6/2008 | Mezack et al. |
| 2008/0155440 A1 | 6/2008 | Trevor et al. |
| 2008/0195417 A1 | 8/2008 | Surpin et al. |
| 2008/0195608 A1 | 8/2008 | Clover |
| 2008/0222038 A1 | 9/2008 | Eden et al. |
| 2008/0222295 A1 | 9/2008 | Robinson et al. |
| 2008/0243711 A1 | 10/2008 | Aymeloglu et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0301042 A1 | 12/2008 | Patzer |
| 2008/0301643 A1 | 12/2008 | Appleton et al. |
| 2008/0313132 A1 | 12/2008 | Hao et al. |
| 2009/0018940 A1 | 1/2009 | Wang et al. |
| 2009/0018996 A1 | 1/2009 | Hunt et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0076845 A1 | 3/2009 | Bellin et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0094166 A1 | 4/2009 | Aymeloglu et al. |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0144262 A1 | 6/2009 | White et al. |
| 2009/0144274 A1 | 6/2009 | Fraleigh et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222760 A1 | 9/2009 | Halverson et al. |
| 2009/0228365 A1 | 9/2009 | Tomchek et al. |
| 2009/0234720 A1 | 9/2009 | George et al. |
| 2009/0249244 A1 | 10/2009 | Robinson et al. |
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0287628 A1 | 11/2009 | Indeck et al. |
| 2009/0292626 A1 | 11/2009 | Oxford |
| 2009/0300589 A1 | 12/2009 | Watters et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0011282 A1 | 1/2010 | Dollard et al. |
| 2010/0030722 A1 | 2/2010 | Goodson et al. |
| 2010/0031141 A1 | 2/2010 | Summers et al. |
| 2010/0042922 A1 | 2/2010 | Bradateanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077483 A1 | 3/2010 | Stolfo et al. |
| 2010/0094765 A1 | 4/2010 | Nandy |
| 2010/0098318 A1 | 4/2010 | Anderson |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0138354 A1* | 6/2010 | Lawrence ............... G06Q 40/08 |
| | | 705/317 |
| 2010/0161735 A1 | 6/2010 | Sharma |
| 2010/0162176 A1 | 6/2010 | Dunton |
| 2010/0169192 A1 | 7/2010 | Zoldi et al. |
| 2010/0169237 A1 | 7/2010 | Howard et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0312837 A1 | 12/2010 | Bodapati et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004626 A1 | 1/2011 | Naeymi-Rad et al. |
| 2011/0047159 A1 | 2/2011 | Baid et al. |
| 2011/0055074 A1 | 3/2011 | Chen et al. |
| 2011/0060753 A1 | 3/2011 | Shaked et al. |
| 2011/0061013 A1 | 3/2011 | Bilicki et al. |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce, III et al. |
| 2011/0099133 A1 | 4/2011 | Chang et al. |
| 2011/0099628 A1 | 4/2011 | Lanxner et al. |

(56) References Cited

U.S. PATENT DOCUMENTS

| | | |
|---|---|---|
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0185316 A1 | 7/2011 | Reid et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219450 A1 | 9/2011 | McDougal et al. |
| 2011/0225198 A1 | 9/2011 | Edwards et al. |
| 2011/0225586 A1 | 9/2011 | Bentley et al. |
| 2011/0231223 A1 | 9/2011 | Winters |
| 2011/0231305 A1 | 9/2011 | Winters |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0251951 A1 | 10/2011 | Kolkowitz |
| 2011/0258158 A1 | 10/2011 | Resende et al. |
| 2011/0270604 A1 | 11/2011 | Qi et al. |
| 2011/0270705 A1 | 11/2011 | Parker |
| 2011/0270834 A1 | 11/2011 | Sokolan et al. |
| 2011/0289397 A1 | 11/2011 | Eastmond et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0011238 A1 | 1/2012 | Rathod |
| 2012/0011245 A1 | 1/2012 | Gillette et al. |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084117 A1 | 4/2012 | Tavares et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0144335 A1 | 6/2012 | Abeln et al. |
| 2012/0158585 A1 | 6/2012 | Ganti |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0173381 A1 | 7/2012 | Smith |
| 2012/0173985 A1 | 7/2012 | Peppel |
| 2012/0196557 A1 | 8/2012 | Reich et al. |
| 2012/0196558 A1 | 8/2012 | Reich et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0226590 A1* | 9/2012 | Love ............... G06Q 40/12 705/30 |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0278249 A1 | 11/2012 | Duggal et al. |
| 2012/0290879 A1 | 11/2012 | Shibuya et al. |
| 2012/0296907 A1 | 11/2012 | Long et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323888 A1 | 12/2012 | Osann, Jr. |
| 2012/0330973 A1 | 12/2012 | Ghuneim et al. |
| 2013/0006426 A1 | 1/2013 | Healey et al. |
| 2013/0006725 A1 | 1/2013 | Simanek et al. |
| 2013/0016106 A1 | 1/2013 | Yip et al. |
| 2013/0018796 A1 | 1/2013 | Kolhatkar et al. |
| 2013/0024307 A1 | 1/2013 | Fuerstenberg et al. |
| 2013/0024339 A1 | 1/2013 | Choudhuri et al. |
| 2013/0046842 A1 | 2/2013 | Muntz et al. |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0111320 A1 | 5/2013 | Campbell et al. |
| 2013/0117651 A1 | 5/2013 | Waldman et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0211985 A1 | 8/2013 | Clark et al. |
| 2013/0224696 A1 | 8/2013 | Wolfe et al. |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0238664 A1 | 9/2013 | Hsu et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0251233 A1 | 9/2013 | Yang et al. |
| 2013/0262328 A1 | 10/2013 | Federgreen |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318594 A1 | 11/2013 | Hoy et al. |
| 2013/0325826 A1 | 12/2013 | Agarwal et al. |
| 2013/0339218 A1 | 12/2013 | Subramanian et al. |
| 2014/0006109 A1 | 1/2014 | Callioni et al. |
| 2014/0012724 A1 | 1/2014 | O'Leary et al. |
| 2014/0012796 A1 | 1/2014 | Petersen et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |

(56) References Cited

U.S. PATENT DOCUMENTS

| | | |
|---|---|---|
| 2014/0040371 A1 | 2/2014 | Gurevich et al. |
| 2014/0047357 A1 | 2/2014 | Alfaro et al. |
| 2014/0058914 A1 | 2/2014 | Song et al. |
| 2014/0059038 A1 | 2/2014 | McPherson et al. |
| 2014/0068487 A1 | 3/2014 | Steiger et al. |
| 2014/0095273 A1 | 4/2014 | Tang et al. |
| 2014/0095363 A1 | 4/2014 | Caldwell |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149272 A1 | 5/2014 | Hirani et al. |
| 2014/0149436 A1 | 5/2014 | Bahrami et al. |
| 2014/0156484 A1 | 6/2014 | Chan et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0222521 A1 | 8/2014 | Chait |
| 2014/0222752 A1 | 8/2014 | Isman et al. |
| 2014/0222793 A1 | 8/2014 | Sadkin et al. |
| 2014/0229554 A1 | 8/2014 | Grunin et al. |
| 2014/0267294 A1 | 9/2014 | Ma |
| 2014/0267295 A1 | 9/2014 | Sharma |
| 2014/0278730 A1* | 9/2014 | Muhart ............ G06Q 10/0635 |
| | | 705/7.28 |
| 2014/0279824 A1 | 9/2014 | Tamayo |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0358789 A1 | 12/2014 | Boding et al. |
| 2014/0358829 A1 | 12/2014 | Hurwitz |
| 2014/0366132 A1 | 12/2014 | Stiansen et al. |
| 2015/0019394 A1 | 1/2015 | Unser et al. |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0089424 A1 | 3/2015 | Duffield et al. |
| 2015/0095773 A1 | 4/2015 | Gonsalves et al. |
| 2015/0100897 A1 | 4/2015 | Sun et al. |
| 2015/0100907 A1 | 4/2015 | Erenrich et al. |
| 2015/0106379 A1 | 4/2015 | Elliot et al. |
| 2015/0134512 A1 | 5/2015 | Mueller |
| 2015/0135256 A1 | 5/2015 | Hoy et al. |
| 2015/0161611 A1 | 6/2015 | Duke et al. |
| 2015/0178825 A1 | 6/2015 | Huerta |
| 2015/0188872 A1 | 7/2015 | White |
| 2015/0227868 A1* | 8/2015 | Saraf ............... G06Q 10/0635 |
| | | 705/7.28 |
| 2015/0227869 A1* | 8/2015 | Saraf ............... G06Q 10/0635 |
| | | 705/7.28 |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |
| 2016/0044054 A1 | 2/2016 | Stiansen et al. |
| 2016/0086185 A1 | 3/2016 | Adjaoute |
| 2016/0117486 A1 | 4/2016 | Blumenfeld et al. |
| 2016/0321661 A1* | 11/2016 | Hammond ............ G06Q 20/20 |
| 2017/0147654 A1 | 5/2017 | Saperstein et al. |
| 2017/0221063 A1 | 8/2017 | Mathura et al. |
| 2018/0075563 A1 | 3/2018 | Ananthanpillai et al. |
| 2018/0173769 A1 | 6/2018 | Saperstein et al. |
| 2023/0394605 A1* | 12/2023 | Man ............... G06Q 10/0635 |

FOREIGN PATENT DOCUMENTS

| | | |
|---|---|---|
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1191463 | 3/2002 |
| EP | 1672527 | 6/2006 |
| EP | 2487610 | 8/2012 |
| EP | 2551799 | 1/2013 |
| EP | 2555153 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2889814 | 7/2015 |
| EP | 2891992 | 7/2015 |
| EP | 2892197 | 7/2015 |
| EP | 2911078 | 8/2015 |
| EP | 2963595 | 1/2016 |
| EP | 2985729 | 2/2016 |
| EP | 3142057 | 3/2017 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 2000/009529 | 2/2000 |
| WO | WO 2005/104736 | 11/2005 |
| WO | WO 2005/116851 | 12/2005 |
| WO | WO 2008/011728 | 1/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

"A First Look: Predicting Market Demand for Food Retail using a Huff Analysis," TRF Policy Solutions, Jul. 2012, pp. 30.

"A Quick Guide to UniProtKB Swiss—Prot & TrEMBL," Sep. 2011, pp. 2.

"A Word About Banks and the Laundering of Drug Money," Aug. 18, 2012, http://www.golemxiv.co.uk/2012/08/a-word-about-banks-and-the-laundering-of-drug-money/.

Acklen, Laura, "Absolute Beginner's Guide to Microsoft Word 2003," Dec. 24, 2003, pp. 15-18, 34-41, 308-316.

Alfred, Rayner "Summarizing Relational Data Using Semi-Supervised Genetic Algorithm-Based Clustering Techniques", Journal of Computer Science, 2010, vol. 6, No. 7, pp. 775-784.

Amnet, "5 Great Tools for Visualizing Your Twitter Followers," posted Aug. 4, 2010, http://www.amnetblog.com/component/content/article/115-5-grate-tools-for-visualizing-your-twitter-followers.html.

Ananiev et al., "The New Modality API," http://web.archive.org/web/20061211011958/http://java.sun.com/developer/technicalArticles/J2SE/Desktop/javase6/modality/ Jan. 21, 2006, pp. 8.

Appacts, "Smart Thinking for Super Apps," <http://www.appacts.com> Printed Jul. 18, 2013 in 4 pages.

Apsalar, "Data Powered Mobile Advertising," "Free Mobile App Analytics" and various analytics related screen shots <http://apsalar.com> Printed Jul. 18, 2013 in 8 pages.

Bluttman et al., "Excel Formulas and Functions for Dummies," 2005, Wiley Publishing, Inc., pp. 280, 284-286.

(56) References Cited

OTHER PUBLICATIONS

Boyce, Jim, "Microsoft Outlook 2010 Inside Out," Aug. 1, 2010, retrieved from the internet https://capdtron.files.wordpress.com/2013/01/outlook-2010-inside_out.pdf.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Butkovic et al., "Using Whois Based Geolocation and Google Maps API for Support Cybercrime Investigations," Recent Advances in Telecommunications and Circuits: Proceedings of the 11th International Conference on Applied Electromagnetics, Wireless and Optical Communications (ELECTROSCIENCE '13), Proceedings of the 2nd International Conference on Circuits, Systems, Communications, Computers and Applications (CSCCA '13), Proceedings of the 1st International Conference on Solid State Circuits (SSC '13), Proceedings of the 1st International Conference on Antennas & Propagation (ANPRO '13) :Dubrovnik, Croatia, Jun. 25-27, 2013, pp. 194-200, 2013.
Canese et al., "Chapter 2: PubMed: The Bibliographic Database," The NCBI Handbook, Oct. 2002, pp. 1-10.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Chen, "Design and application of criminal investigation DSS based on case reasoning", 2010 2ndInternational Workshop on Database Technology and Applications, pp. 1-5, doi: 10.1109/DBTA.2010.5659104 (2010).
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Cohn, et al., "Semi-supervised clustering with user feedback," Constrained Clustering: Advances in Algorithms, Theory, and Applications 4.1 (2003): 17-32.
Conner, Nancy, "Google Apps: The Missing Manual," May 1, 2008, pp. 15.
Countly Mobile Analytics, <http://count.ly/> Printed Jul. 18, 2013 in 9 pages.
Definition "Identify", downloaded Jan. 22, 2015, 1 page.
Definition "Overlay", downloaded Jan. 22, 2015, 1 page.
Delcher et al., "Identifying Bacterial Genes and Endosymbiont DNA with Glimmer," BioInformatics, vol. 23, No. 6, 2007, pp. 673-679.
Distmo—App Analytics, <http://www.distimo.com/app-analytics> Printed Jul. 18, 2013 in 5 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
"The FASTA Program Package," fasta-36.3.4, Mar. 25, 2011, pp. 29.
Flurry Analytics, <http://www.flurry.com/> Printed Jul. 18, 2013 in 14 pages.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Goswami, Gautam, "Quite Writly Said!," One Brick at a Time, Aug. 21, 2005, pp. 7.
Griffith, Daniel A., "A Generalized Huff Model," Geographical Analysis, Apr. 1982, vol. 14, No. 2, pp. 135-144.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hardesty, "Privacy Challenges: Analysis: It's Surprisingly Easy to Identify Individuals from Credit-Card Metadata," MIT News On Campus and Around the World, MIT News Office, Jan. 29, 2015, 3 pages.
Hibbert et al., "Prediction of Shopping Behavior Using a Huff Model Within a GIS Framework," Healthy Eating in Context, Mar. 18, 2011, pp. 16.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Hua et al., "A Multi-attribute Data Structure with Parallel Bloom Filters for Network Services", HiPC 2006, LNCS 4297, pp. 277-288, 2006.
Huff et al., "Calibrating the Huff Model Using ArcGIS Business Analyst," ESRI, Sep. 2008, pp. 33.
Huff, David L., "Parameter Estimation in the Huff Model," ESRI, ArcUser, Oct.-Dec. 2003, pp. 34-36.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kitts, Paul, "Chapter 14: Genome Assembly and Annotation Process," The NCBI Handbook, Oct. 2002, pp. 1-21.
Kontagent Mobile Analytics, <http://www.kontagent.com/> Printed Jul. 18, 2013 in 9 pages.
Li et al., "Interactive Multimodal Visual Search on Mobile Device," IEEE Transactions on Multimedia, vol. 15, No. 3, Apr. 1, 2013, pp. 594-607.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Localytics—Mobile App Marketing & Analytics, <http://www.localytics.com/> Printed Jul. 18, 2013 in 12 pages.
Madden, Tom, "Chapter 16: The BLAST Sequence Analysis Tool," The NCBI Handbook, Oct. 2002, pp. 1-15.
Manno et al., "Introducing Collaboration in Single-user Applications through the Centralized Control Architecture," 2010, pp. 10.
Manske, "File Saving Dialogs," <http://www.mozilla.org/editor/ui_specs/FileSaveDialogs.html>, Jan. 20, 1999, pp. 7.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Microsoft Office—Visio, "About connecting shapes," <http://office.microsoft.com/en-us/visio-help/about-connecting-shapes-HP085050369.aspx> printed Aug. 4, 2011 in 6 pages.
Microsoft Office—Visio, "Add and glue connectors with the Connector tool," <http://office.microsoft.com/en-us/visio-help/add-and-

(56) References Cited

OTHER PUBLICATIONS glue-connectors-with-the-connector-tool-HA010048532.aspx?CTT=1> printed Aug. 4, 2011 in 1 page.

Mixpanel—Mobile Analytics, <https://mixpanel.com/> Printed Jul. 18, 2013 in 13 pages.

Mizrachi, Ilene, "Chapter 1: GenBank: The Nuckeotide Sequence Database," The NCBI Handbook, Oct. 2002, pp. 1-14.

"Money Laundering Risks and E-Gaming: A European Overview and Assessment," 2009, http://www.cf.ac.uk/socsi/resources/Levi_Final_Money_Laundering_Risks_egaming.pdf.

Nierman, "Evaluating Structural Similarity in XML Documents", 6 pages, 2002.

Nolan et al., "MCARTA: A Malicious Code Automated Run-Time Analysis Framework," Homeland Security (HST) 2012 IEEE Conference on Technologies for, Nov. 13, 2012, pp. 13-17.

Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.

Open Web Analytics (OWA), <http://www.openwebanalytics.com/> Printed Jul. 19, 2013 in 5 pages.

Palmas et al., "An Edge-Bunding Layout for Interactive Parallel Coordinates" 2014 IEEE Pacific Visualization Symposium, pp. 57-64.

Perdisci et al., "Behavioral Clustering of HTTP-Based Malware and Signature Generation Using Malicious Network Traces," USENIX, Mar. 18, 2010, pp. 1-14.

Piwik—Free Web Analytics Software. <http://piwik.org/> Printed Jul. 19, 2013 in18 pages.

"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.

Rouse, Margaret, "OLAP Cube," <http://searchdatamanagement.techtarget.com/definition/OLAP-cube>, Apr. 28, 2012, pp. 16.

Shah, Chintan, "Periodic Connections to Control Server Offer New Way to Detect Botnets," Oct. 24, 2013 in 6 pages, <http://www.blogs.mcafee.com/mcafee-labs/periodic-links-to-control-server-offer-new-way-to-detect-botnets>.

Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.

Sigrist, et al., "PROSITE, a Protein Domain Database for Functional Characterization and Annotation," Nucleic Acids Research, 2010, vol. 38, pp. D161-D166.

Sirotkin et al., "Chapter 13: The Processing of Biological Sequence Data at NCBI," The NCBI Handbook, Oct. 2002, pp. 1-11.

StatCounter—Free Invisible Web Tracker, Hit Counter and Web Stats, <http://statcounter.com/> Printed Jul. 19, 2013 in 17 pages.

Symantec Corporation, "E-Security Begins with Sound Security Policies," Announcement Symantec, Jun. 14, 2001.

TestFlight—Beta Testing On The Fly, <http://testflightapp.com/> Printed Jul. 18, 2013 in 3 pages.

trak.io, <http://trak.io/> printed Jul. 18, 2013 in 3 pages.

Umagandhi et al., "Search Query Recommendations Using Hybrid User Profile with Query Logs," International Journal of Computer Applications, vol. 80, No. 10, Oct. 1, 2013, pp. 7-18.

UserMetrix, <http://usermetrix.com/android-analytics> printed Jul. 18, 2013 in 3 pages.

Valentini et al., "Ensembles of Learning Machines", M. Marinaro and R. Tagliaferri (Eds.): Wirn Vietri 2002, LNCS 2486, pp. 3-20.

Vose et al., "Help File for ModelRisk Version 5," 2007, Vose Software, pp. 349-353. [Uploaded in 2 Parts].

Wang et al., "Research on a Clustering Data De-Duplication Mechanism Based on Bloom Filter," IEEE 2010, 5 pages.

Wiggerts, T.A., "Using Clustering Algorithms in Legacy Systems Remodularization," ReverseEngineering, Proceedings of the Fourth Working Conference, Netherlands, Oct. 6-8, 1997, IEEE Computer Soc., pp. 33-43.

Wikipedia, "Federated Database System," Sep. 7, 2013, retrieved from the internet on Jan. 27, 2015 http://en.wikipedia.org/w/index.php?title=Federated_database_system&oldid=571954221.

Wikipedia, "Multimap," Jan. 1, 2013, https://en.wikipedia.org/w/index.php?title=Multimap&oldid=530800748.

Yang et al., "HTML Page Analysis Based on Visual Cues", A129, pp. 859-864, 2001.

\* cited by examiner

| SAME ADDRESS AS OTHER ENTITIES? | | | | |
|---|---|---|---|---|
| Associated addresses: | Billing address ⊠ | Delivery address ⊠ | | |
| Notes ▾ | ID of entity ⬧ | Entity Name ⬧ | Field of practice ⬧ | Cagetory ⬧ |
| No problems | 111-22-333 ⓘ | SmallCo. South | Transportation | 1.12.4 |
| No problems | 222-33-444 ⓘ | SmallCo. Subsidiary | Engineering | 6.8.13 |
| No problems | 444-55-666 ⓘ | BigCo. | Management | 3.4.4 |
| No problems | 555-66-777 ⓘ | Unrelated Entity Name | Other Services | 7.2.12 |
| No problems | 666-777-88 ⓘ | Other Business Name | Other retail | 5.1.6 |

Showing 1 to 5 of 101 entries

| SAME PHONE NUMBER AS OTHER ENTITIES? | | | |
|---|---|---|---|
| Associated numbers: | 123456789⊠ 234567890⊠ 345678901⊠ 456789012⊠ 567890123⊠ 678901234⊠ | | |
| Notes ▾ | Telephone ⬧ | Entity ID ⬧ | Entity Name ⬧ |
| Minor Alert | 123456789 | 111-00-111 ⓘ | Hardware Store |
| No problems | 234567890 | 222-00-222 ⓘ | Appliance Store |
| No problems | 234567890 | 333-00-333 ⓘ | Joe's tailoring |

Showing 1 to 3 of 121 entries (Risky|Not risky)   Reason: (Choose an option ▽)

[Analyst Comment Here]

FIG. 4

| UNUSUAL PARTNER DATA ? | | | | | |
|---|---|---|---|---|---|
| ID num. | Name | Education | Profession | Age/Average Age | Income/Average Inc |
| 098-76-543 | John Doe | Post-Graduate | No Info | 28/38 | 50,000/80,000 |
| 123456 | Jane Doe | Graduate | No Info | 25/38 | 20,000/60,000 |
| 555-55-555 | Jordan Belfort | B.S.Biology | Broker | 32/25 | 12,681,284/180,000 |
| 999-99-999 | Al Capone | None | No Info | No Info | 52,765,788/NA |

Showing 1 to 4 of 6 entries (Risky) (Not risky)   Reason: ( Choose an option ▽ )

Analyst Comment Here

| SUSPICIOUS EXTENDED RELATIONSHIPS? | | | | ANALYZE DEGREES: 4 (FOUR) | |
|---|---|---|---|---|---|
| Restrictions? ▽ | Name | ID Num. | Industry | Date Founded | Address |
| 2 Alerts! | Other Entity 1 | N/A | N/A | 9/1/1980 | 123 1st Street |
| · | Other Entity 2 | ABC123 | Cosmetics | 7/20/2016 | 124 1st Street |
| · | Other Entity 3 | XYZ123 | Industry 3 | 4/1/2016 | 125 1st Street |

Showing 1 to 3 of 29 entries          Previous [1] 2 3 4 5

⊘ Noted Alert ⊘ Restrictions ⊙ Other ⊙ Rejected Client ⊕ Public Figure ○ Foregin 🔍 Filter Input

- ▾ 🏢 11442110/0001-20    Other Entity 1
  - ▸ 🏢 25247658/0001-23    Entity 1's Supplier
  - ▸ 🏢 07222404/0001-79    Entity 1's Other Supplier
  - ▸ 🏢 19359511/0001-22    Advertising
  - ⊘ ▸ 🏢 18106771/0001-23    Entity 1's Retail
    - 👤 049449306    Alice Aaron    20.00%
    - 👤 111042286    Bob Baker    2.00%
    - ● 👤 069234956    Al Capone    58.00%
    - ⊘ 👤 081475166    Jordan Belfort    20.00%

Entity 1's Retail
       20%  2%  58%  20%
Alice Aaron  Bob Baker  Al Capone  Jordan Belfort (Risky) (Not risky)   Reason: ( Choose an option ▽ )

Analyst Comment Here

FIG. 5

Small Co.
Tax ID: 123-45-6789

Navigation
- General Info
- Organization Risks
- Partner Risks
- Transaction Risks
  - Revenue Consistency
  - Transaction Consistency with industry
  - Transactions in unusual regions
  - Other Risk Factors
- Detailed transaction flow
- Other Risks & Info
- Summary & Save

603

REVENUE CONSISTENCY: INTERNAL/REPORTED — 601

Select Sources: Internal data v. Reported for Taxes ▾   Select time period: Past Year ▾

| Actual transactions sent | Actual transactions received | Reported transactions |
|---|---|---|
| 282,235.00 | 307,742.00 | 25,507.00 From: 1/1/2010-12/31/2010 |

Legend: Reported, Sent, Received

Bar chart — 605 — years 2005, 2006, 2007, 2008, 2009, 2010 (0 to 300K)

(Risky | Not risky)   Reason: Choose an option ▾
Analyst Comment Here

TRANSACTIONS CONSISTENCY WITH INDUSTRY

Sent & Received ▾   Select time period: Past 6 mo ▾   Select Data Sources: All ▾

| Alert | Industry | Direction | Avg. Value | % |
|---|---|---|---|---|
| Yes | Laundromats | Receive | 35,739 | 8.6X |
| Yes | Cleaners | Send & receive | 54,832 | 10.7X |
| Yes | Tailors | Send & receive | 44,348 | 13.3X |
| Yes | Washing Appliances | Send & receive | 1,289,394 | 46% |

Showing 1 to 4 of 6 entries     Previous [1] Next (Risky | Not risky)   Reason: Choose an option ▾
Analyst Comment Here

TRANSACTIONS IN UNUSUAL REGIONS

Sent & Received ▾

| Alert | Region | Direction | Value | % |
|---|---|---|---|---|
| Yes | Cayman Isls. | Send | 250,000 | 89% |
| Yes | Saychelles | Receive | 250,000 | 81% |
| No | Hometown, State | Both | 32,235 | 5% |
| Yes | New York, NY | Both | 557,742 | 95% |

(Risky | Not risky)   Reason: Choose an option ▾
Analyst Comment Here

FIG. 6

Transactions With High Risk Entities

[Sent and Received ▽] [All transactions ▽] [Past 12 months ▽] [All available databases ▽]

| Restrictions | ID num. | Name | Direction | Value | % total | Other |
|---|---|---|---|---|---|---|
| | AAA BBB | N/A | Sent | 11,850 | 2% | X |
| | N/A | Washing Appliances Inc. | Both | 11,750 | 2% | X |
| | CCCDDD | Repair Services Co. | Sent | 11,800 | 2% | X |
| Yes | XXX-11-YY | Saychelles Trust | Sent | 277,289 | 47% | X |
| Yes | ZZZ-22-XX | Cayman Bank | Received | 277,289 | 47% | X |

Showing 1 to 5 of 5 entries            Previous [1] Next

Web of (top 5 by %) transactions + (top 5 by value) transactions in (one) degree of connection

[Risky] [Not Risky]   Reason: [Choose an Option ▽]

[Analyst Comment Here]

FIG. 7

ARTIFICIAL INTELLIGENCE ASSISTED EVALUATIONS AND USER INTERFACE FOR SAME

CROSS-REFERENCE TO RELATED APPLICATIONS

The present application is a continuation of U.S. patent application Ser. No. 16/116,629, filed Aug. 29, 2018, now U.S. Pat. No. 11,119,630, which application claims priority to U.S. Provisional Patent Application No. 62/686,994, filed Jun. 19, 2018. The entire disclosure of each of the above items is hereby made part of this specification as if set forth fully herein and incorporated by reference for all purposes, for all that it contains.

TECHNICAL FIELD

The present disclosure relates to artificial intelligence (AI) systems, techniques, and interfaces for investigations and improved background checking.

BACKGROUND

In the field of investigation, investigators manually reviewed case files to determine connections between each clue in the case files. Using their gut and instinct, the investigators could guess at which individuals seem suspicious and further investigate those individuals. This process was very tedious and time consuming, as well as inaccurate due to the large number of documents and clues in each case file to review to determine whether an individual was suspect. Automated technologies are not to provide a satisfactory replacement and not able to provide an accurate replacement.

One technique that is employed can be to perform a criminal history background check, such as by reviewing court records. However, this provides limited information. Some states may seal or purge criminal records. Some individuals or entities engaging in illegal activity or planning to engage in illegal activity may not yet have a criminal history record. Due to such limitations, a simple criminal history background check may be a poor indicator for an individual's risk of illegal activities.

SUMMARY

Some aspects feature a computer system configured to provide an interactive user interface for generating feedback to AI models and for efficient investigations, the computer system comprising: one or more computer readable storage devices configured to store computer readable instructions; a communications interface configured for data transmission; and one or more processors. The one or more processors are configured to execute the plurality of computer readable instructions to cause the computer system to perform operations comprising: accessing data associated with an entity; applying a plurality of models to the data to generate a plurality of assessments; and transmitting, through the communications interface, user interface data useable for rendering an interactive user interface. The interactive user interface includes: in a first user interface portion, individually selectable indications of a plurality of factors and indications of associated assessments; and a second user interface portion that is dynamically updateable to display, in response to user selections of the individually selectable factors, data associated with selected factors.

The computer system of the above paragraph can include one, any combination of, or all of the following features. The models can be artificial intelligence (AI) models. The AI models include at least one random forest model, supervised learning model, or classification model. The one or more processors are configured to execute the plurality of computer readable instructions to cause the computer system to perform further operations comprising: receiving a first analyst evaluation of a first risk factor; and updating a first AI model based at least in part on the first analyst evaluation, wherein the first AI model is used to generate a first risk assessment for determining an AI evaluation of the first risk factor. Accessing data associated with the entity includes accessing at least 10 databases storing a total of at least ten thousand data entries, the plurality of assessments includes at least 10 assessments, and different databases of the at least 10 databases are used for generating the plurality of assessments. Applying a plurality of models to the data to generate a plurality of assessments includes applying a first model to the data to generate a first assessment of a first factor, the individually selectable indications of a plurality of factors includes a textual description of the first factor, and the indications of associated assessments includes a color coded indicator of the first assessment. The one or more processors are configured to execute the plurality of computer readable instructions to cause the computer system to perform further operations comprising: generating a combined risk assessment based on a weighted combination of the plurality of assessments. The one or more processors are configured to execute the plurality of computer readable instructions to cause the computer system to perform further operations comprising: storing, in an archive, at least two of: a first AI evaluation based at least in part on one of the plurality of assessments for a first factor, an analyst evaluation of the first factor, or the data used to generate a first assessment for the first factor. The one or more processors are configured to execute the plurality of computer readable instructions to cause the computer system to perform further operations comprising: generating, using the data associated with the entity, a graphical visualization of the data, where the graphical visualization includes at least one graph, table, web, or chart. The graphical visualization includes at least one: web indicating relationships between the entity and other entities, wherein the web is dynamically configurable by the user to extend to a variable number of degrees of connections; chart or table comparing transaction data reported by the entity against transaction data compiled from the one or more internal databases of transactions by the entity; or a chart visualizing a comparison or breakdown of categories of transactions. A first model of the plurality of models is applied to a subset of the data to generate a first assessment of the plurality of assessments, and the one or more processors are configured to execute the plurality of computer readable instructions to cause the computer system to perform further operations comprising: receiving a user selection of a first risk factor that is related to the first assessment, and in response to receiving the user selection of the first risk factor, generating, using the subset of the data, a graphical visualization of the subset of the data. The one or more processors are configured to execute the plurality of computer readable instructions to cause the computer system to transmit the user interface data in response to at least one or a combination of the plurality of assessments indicating a high risk. Accessing data associated with an entity includes searching one or more databases for at least one of: asset transfer restrictions against the entity, travel restrictions against the entity, or a number of legal warrants or court orders against the entity. Accessing data associated with an entity includes searching one or more databases for at least one of: transactions or relationships between the entity and public figures or celebrities, transactions or relationships between the entity and government figures, or transactions or relationships between the entity and other entities known to or at high risk for involvement with illegal activity. Applying a plurality of models to the data to generate a plurality of assessments includes comparing at least one of: a frequency of transactions by the entity to a reference frequency of transactions, a quantity of transactions by the entity to a reference quantity of transactions, methods used by the entity to make transactions against reference methods of making transactions, or internal or private data records about the entity to public data records about or reported by the entity. Applying a plurality of models to the data to generate a plurality of assessments includes determining at least one of: a distance between a physical address associated with the entity and a physical address of a business used by that the entity, or whether addresses or contact information associated with the entity is shared by other entities. The entity and other entities are engaged in a same field of practice, and wherein applying a plurality of models to the data to generate a plurality of assessments includes at least one of: comparing registrations or licenses of the entity to registrations or licenses of the other entities, or comparing transactions of the entity to the other entities. Applying a plurality of models to the data to generate a plurality of assessments includes applying a first set of models to generate a first plurality of assessments for a first group of risks in a first context. The one or more processors are configured to execute the plurality of computer readable instructions to cause the computer system to periodically, randomly, or routinely perform further operations comprising: accessing updated data associated with the entity, and applying a second plurality of models to generate a second plurality of assessments for a second group of risks in a second context. The interactive user interface further includes a third user interface portion that is dynamically updateable to display, in response to the user selections of the individually selectable factors, AI evaluations of the selected factors.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying and report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing system and technology for reviewing data (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 2 shows an example of user interface for evaluating the risk of client participation in illegal activity.

FIG. 4 shows an example user interface with additional data for analyzing organization risk factors.

FIG. 5 shows an example user interface for analyzing risk factors related to partners of a client.

FIG. 6 shows an example user interface for analyzing risk factors related to transaction risk.

FIG. 7 shows an example user interface with additional data for analyzing risk factors related to transaction risk.

DETAILED DESCRIPTION

Introduction

Figure 1:
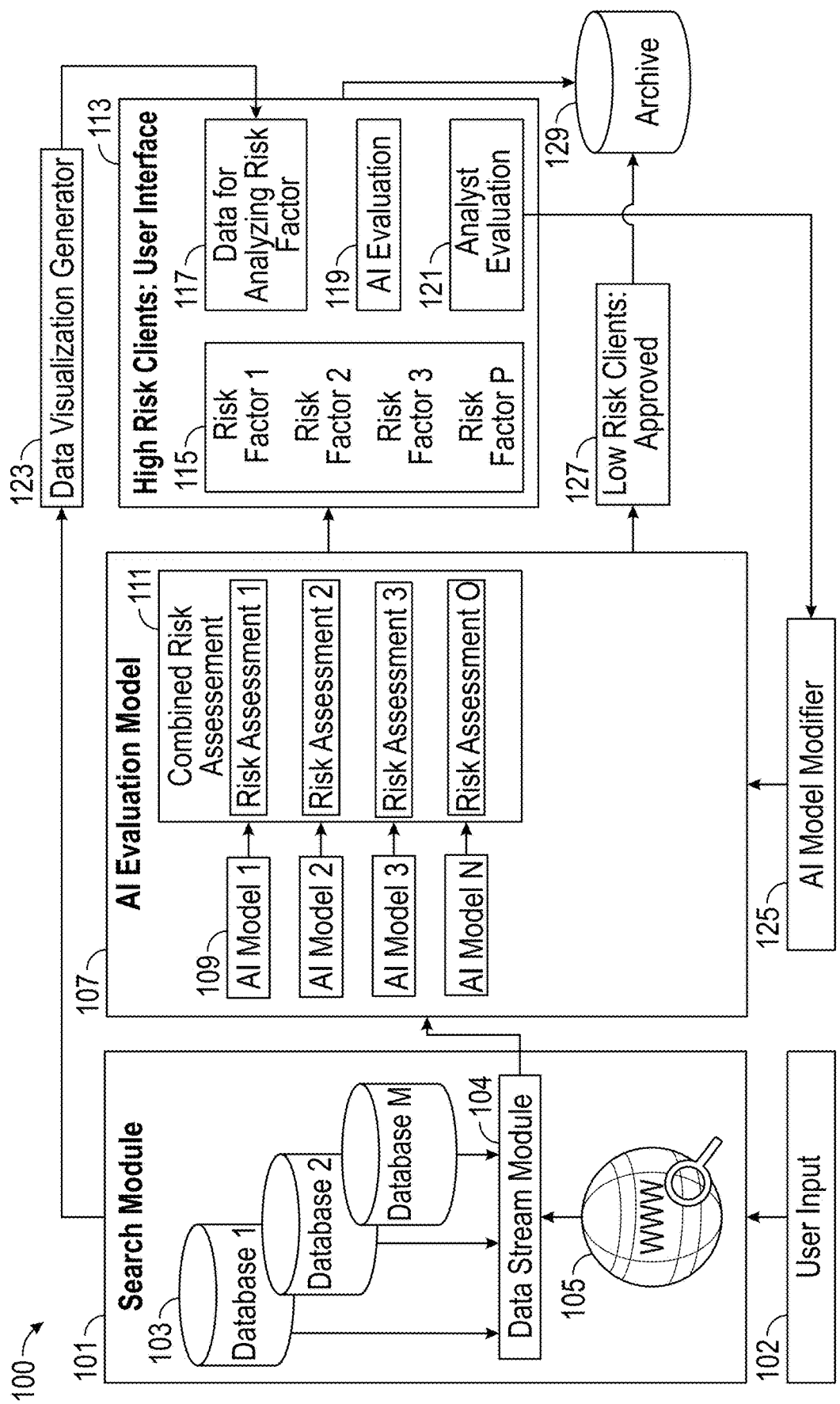
FIG. 1 shows an example AI system for evaluating the risk of client participation in illegal activity.

In some cases, law-abiding individuals or organizations may want to detect or screen for client entities who are likely involved with illegal activity such as money laundering so that the law-abiding individuals or organizations can avoid working with those clients. However, manually investigating every client can be very tedious and time consuming, and many factors can be overlooked. Accordingly, disclosed herein are systems and methods for automatically analyzing and detecting clients who may be engaged in illegal activity, and doing so in a faster, cost effective, and more accurate manner. A system can, on a large scale, process records to automatically analyze those records for clues to detect possible illegal activity based on various combinations of indicators. To improve accuracy and continually adapt to changing techniques used by individuals to evade detection, the system can include an artificial intelligence component that continually improves through feedback.

Disclosed herein are embodiments that automate an investigator's tasks. Some embodiments enable a computer system to provide at least a partial substitute for the "gut" or "instinct" determination. The automation is accomplished through rules that are applied to records in a database and other information to determine weighted risk assessments. The disclosure includes many exemplary rule sets that go beyond simply performing a criminal background check. Instead, the rule sets can produce more accurate investigation results by taking into consideration combinations of indicators and new sources of data based on different contexts.

Some organizations may provide goods or services to clients. Some of those organizations may provide goods or services that, although generally used by law-abiding citizens, can also be used for illegal activity. For example, gun stores may sell guns for hunting and self-defense, banks may provide various financial services to the general public, chemical suppliers may sell chemicals for research and industrial uses, etc. The gun stores may want to avoid selling guns to people who will use the guns for violence, banks may want to avoid working with money launderers, and chemical suppliers may want to avoid selling to terrorists. Often times, simple state or federal background checks can be insufficient. To allow for a clearer understanding of the concepts, this detailed description is discussed with respect to examples of a bank that wants to avoid taking on clients who are likely to engage in money laundering. However, it will be understood that the technology and techniques disclosed herein can be extended to any type of organization with any type of client relationship.

The law-abiding organizations may desire to document their diligence in investigating their clients. For example, the organizations may document their investigation of each client to justify engaging in a business relationship with the client. The organizations can establish business relationships with low risk clients who pass the investigation and refuse to work with clients who are deemed high risk. If the client is later discovered to engage in illegal activities, then the organization can justify the bona fide business relationship with (what was thought to be) a low risk client and avoid complicit liability.

The system and techniques disclosed herein allow for a more accurate, comprehensive, and faster analysis of a client. The amount of data used for each investigation can be increased for a more accurate result. Databases including thousands or millions of records or more can be searched. By automating certain parts, organizations can hire fewer investigators. Some or most investigations can now be completed by a computer system without human analysis and feedback, greatly reducing the number of investigations performed. Furthermore, the speed of investigations is accelerated. In addition to reducing the amount of manual review, a well-designed user interface allows for analysts to more quickly analyze data that, when presented in other formats, would be analyzed much more slowly. See Dillon, A. (2003) User Interface Design. MacMillan Encyclopedia of Cognitive Science, Vol. 4, London: MacMillan.

The system also allows for a standardized evaluation process to be performed on a plurality of clients. Available data from multiple databases is processed and presented to an analyst, even if the analyst would not have otherwise thought to examine the data. Decision making about whether to accept, reject, or terminate a relationship with a client can be speeded up.

Overview

FIG. 1 shows an example AI system 100 for evaluating the risk of client participation in illegal activity. The system includes a search module 101 for using a data stream module 104 to search databases 103 or the internet 105 based on user input 102, an AI evaluation module configured to execute a plurality of AI models 109 to generate risk assessments 111, a user interface 113, a data visualization generator 123, an AI model modifier 125, a low risk client approval module 127, and an archive 129. The user interface 113 can include a first area showing a plurality of risk factors 115, a second area showing data 117 for analyzing a risk factor, a third area showing one or more AI evaluations 119, and a fourth area for receiving an analyst evaluation 121 of the risk factor. Using the AI system 100 of FIG. 1, the review of clients for risk indicators can be partially automated, and data is presented in a format to facilitate detection of high risk clients.

The user input 102 can indicate a client to be analyzed to assess a risk of the client's participation in illegal activity, such as laundering. The search module 101 can search for information about the client in various databases 103 and the internet 105. The search results from the various databases 103 and/or the internet can be provided to a plurality of AI models 109. Each AI model 109 can be configured to assess a specific type of risk indicator and generate risk assessments 111. The individual risk assessments from each AI model 109 can be combined into a combined risk assessment. The combined risk assessment can be compared against a threshold amount to determine a risk. If the client's combined risk assessment indicates a low risk, then the client can be approved. Otherwise, if the client's combined risk assessment indicates a high risk, or in some embodiments, if one or a combination of individual risk assessments indicate a high risk, then a user interface 113 can be generated to facilitate an analyst's review of the data. The user interface 113 can present data 117 for analyzing one or more risk factors and AI evaluations 119 of risk factors. The analyst can review the data 117 and provide an analyst evaluation 121 of one or more risk factors. The analyst evaluation can be used as feedback to the AI model modifier 125. The AI models 109 can be modified based on the feedback. The AI and analyst risk evaluations and data for analyzing the risk factors can be stored in an archive 129. Although the user input 102 for searching is described in the context of a potential client for investigation, it will be understood that the search can be performed on any entity in any context, regardless of whether there is a potential "client" relationship.

User input 102 can indicate a client to be analyzed for a likelihood of illegal activity such as laundering. The user input can include a name of the client, government issued-identification numbers (such as a driver's license number, social security number, military ID number, national ID number, passport number, tax ID number, business entity ID number, etc.), a birthday, online usernames, addresses, and/or other personally identifying information. The type of user input provided can also affect the types of databases 103 used, the types of AI models 109 applied, the types of risk assessments 111 determined, and the types of risk factors 115 analyzed. For example, different databases 103, AI models 109, risk assessments 111, and/or risk factors 115 can be analyzed if the identifier indicates that the entity is a person (such as with a driver's license, name, passport number, or social security number) as opposed to a business (such as with a business name, tax ID number, etc.).

The user input 102 can also indicate a context for the client. The context can also affect the types of databases 103 used, the types of AI models 109 applied, the types of risk assessments 111 determined, and the types of risk factors 115 analyzed. For example, a first combination of databases 103, AI models 109, risk assessments 111, and risk factors 115 can be used to evaluate new clients. A second combination of databases 103, AI models 109, risk assessments 111, and risk factors 115 can be used to evaluate a current client. In some cases, the analysis for the "current client" context can be periodically, randomly, according to selection algorithms, or routinely run for all clients, such as daily, weekly, monthly, annually, or at other times with or without a user-provided indication of context.

A search module 101 can search multiple databases 103 for data about the client. Multiple databases 103 including databases 1 through M, where M can be any number, can be searched for information about the client. The databases 103 can include court databases, criminal history databases, and government databases. The databases 103 can also include databases of transactions involving the client, such as assignments of property, transfers of value, wires, checks, deposits, etc. including who the client transacted with. The databases 103 can also include social networks, ancestry databases, community databases, and other databases indicating relationships between individuals. The databases 103 can also include communication databases including emails, phone calls, communication records, text messages, etc. The databases 103 can also include private databases of commercial entities. For example, a group of commercial entities (such as a group of banks, a group of gun shops, or a group of chemical makers) may pool their private databases with other entities and allow access for the purpose of vetting clients. The databases 103 can also include public record databases, employment databases, news databases, and other archives. The databases 103 can also include commercial entity registration databases, securities reports and filings databases, meeting minutes databases, vote and decision databases, and other databases that may indicate an affiliation or business relationship with the client. The databases 103 can also include shipping databases, manifest databases, transportation databases, mail databases, and other databases recording the transfer of goods, product, or cargo to/from the client. Any other type of database that may have information about the client, the client's relationships with others entities, information about the other entities, and/or reference data for demographic groups and normal indicators can be searched. In the context of a current client, a database of the current client's history of activities, orders, and transactions with the organization can also be searched. In some embodiments, at least 10, 20, 30, 40, 50, 60, or any number of different databases 103 can be searched.

Additionally, the search module 101 can perform a search for the client on the internet 105, including searching databases accessible via the internet 105. Additionally, the internet can search for the client on news sites, online archives, search engines, social media sites, etc. The internet can also be used to search for and determine the context of an internet article that the client is found in, such as whether the client is found in news articles, political articles, popularly viewed posts, near keywords indicating a positive, negative, or controversial context, etc.

A data stream module 104 can be used to process the data from the databases 103. The data stream module 104 can be configured to track and cross-search the databases 103 and/or the internet 105. For example, to determine how many transactions John Doe has conducted over the past year, the data stream module can search a first database for a first company's transactions with John Doe and also search a second database for a second company's transactions with John Doe, and the data stream module 104 can generate an output including the de-duplicated union of data from the first database and from the second database. As another example, to search for the partners with equity in BigCo., the data stream module 104 can search a first database of companies and partners for data about the partners of BigCo., search a second database of subsidiaries of businesses to find subsidiaries of BigCo., search the first database again for the partners of the subsidiaries, and then generate an output including the de-duplicated union of data. The data stream module 104 can be used to provide a more comprehensive, more accurate, and smaller sized (de-duplicated) data set. In some embodiments, the data stream module can provide access to a plurality of data sets, streams of data, and/or streams of search results.

The AI evaluation module 107 can be configured to provide different combinations of the data from the databases 103 to different AI models 109. There can be a plurality of AI Models 1 to N, where N can be any number. Some models such as AI Model 3 can be used to analyze data from one database such as Database 3. Other models such as AI model 2 can be used to analyze combinations of data from a plurality of databases. Data from some databases such as Database 1 can be provided to a plurality of AI models. Each AI model can be configured to analyze a risk factor, some examples of which are provided in later sections of this disclosure. The AI models 109 can include, for example, random forest models, learning based models, classification models, nearest neighbor models, supervised or unsupervised learning models, regression models, clustering models, neural network models, reinforcement models, decision tree models, support vector machine models, association models, rule based models, or other types of AI models. Different types of AI models can be used for analyzing different risk factors.

Each AI model 109 can generate a risk assessment 111 for a risk factor 115. The risk assessment can be a Boolean variable (such as risky or not risky), a number (such as 0 to 100), etc. The risk assessments 111 can also include a combined risk assessment. The combined risk assessment can be a weighted combination of each individual risk assessment 1 through O, where O can be any number. In some embodiments, the number of risk assessments can match the number of AI models. In some embodiments, there can be a different number of risk assessments and AI models, for example, if an average output of two different AI models are used to generate a single risk assessment for a risk factor.

One or a combination of risk assessments 111 can be used to determine if the client is a low risk client. If the combined risk assessment indicates that the client is a low risk client (for example, if the combined risk assessment is compared to and determined to be less than a threshold combined risk assessment), then the client can be approved, and the organization can engage the client and provide products or services. Furthermore, the data used for analysis and the resulting risk assessments indicating a low likelihood of illegal activity such as laundering can be stored in an archive. The archive data can be preserved, such as using block chain, distributed ledger, cumulative checksums, rewrite restrictions, encryptions, or other technology to prevent later tampering.

If the combined risk assessment indicates that the client is a high risk client (for example, if the combined risk assessment is compared to and determined to be higher than a threshold combined risk assessment, or if certain one or combinations of individual risk assessments exceed thresholds), then the client can be evaluated by the AI as high risk olds), and an interactive user interface 113 can be generated to facilitate a detailed review of data about the client.

In the user interface 113, a plurality of risk factors 115 from Risk Factor 1 to Risk Factor P, where P can be any number, can be displayed in a first portion. In the first portion, the risk factors 115 can be color coded based on risk assessments and/or AI evaluations, arranged in order of risk assessment and/or AI evaluation, or have other visual indicators that indicate a degree of risk assessed for each risk factor 115. For example, the first portion of the user interface can include a textual description of the risk factors and a color coded indicator based on the assessment(s) used for evaluating each risk factor. Additionally or alternatively, a color coded indicator based on the AI evaluations for each of the respective risk factors can be included in the first portion. A user can select one of the risk factors 115, and the user's selection can cause data 117 to be displayed in a second portion of the user interface. The data 117 can include visual data such as charts, graphs, tables, webs, etc. generated by the data visualization generator. The data 117 can include data about the client as well as contextual information (e.g., about other clients or demographics) for comparison so that the risk factor can be analyzed. An example of color coded risk factors 307 in a first portion of a user interface is shown in the menu 303 of FIG. 3.

The data 117 can be dynamically generated for display in response to a user's selection of a risk factor (such as Risk Factor 2) and displayed in a second portion of the user interface. The data 117 can include the data from the databases used in assessing the selected risk factor. Accordingly, from among the plurality of databases 103, if a smaller subset (such as Database 1 and Database 2) of the plurality of databases is relevant to the selected risk factor (such as Risk Factor 2), then the data 117 can include the data relevant to the client from the smaller subset (such as Database 1 and Database 2) of the plurality of databases and omit information from the other databases (such as Database 3 through Database M).

Data in databases can be stored in a form that is easy for computer processors to process but difficult for an analyst to quickly analyze. The data visualization generator can, for some types of data relevant to the client from the smaller subset of the plurality of databases, convert the data into a form that is more easily understood and analyzed by humans. Accordingly, the data can be reformatted for display. Furthermore, the data in the databases can be too voluminous for a person to review in a reasonable amount of time. For some types of data for some types of risk factors, the relevant data from the relevant databases can be aggregated before being displayed as data 117. For example, totals, averages, distributions, or trends over time of large amounts of data can be shown instead of the thousands, millions, or billions of underlying data entries.

The data 117 can be dynamically generated. In some embodiments, the data 117 can be generated for each risk factor for a client in response to a determination that the client is a high risk client. This way, the data can be ready for quick display when a user selects a risk factor. In some embodiments, the data 117 can be generated almost instantly or within several seconds for a selected risk factor in response to a user selection of a risk factor, even if there are very large amounts of underlying data entries. Either way, generating the visualization of data can be skipped for low risk clients (which can make up over 90% or 99% of clients), saving substantial amounts of processing time and power, and freeing up computing resources for performing detailed analysis of the data used for evaluating the high risk clients. An example of data 117 for analyzing a risk factor is shown as data 305 in FIG. 3.

Figure 3:
FIG. 3 shows an example user interface for analyzing organization risk factors.

In a third portion of the user interface, an AI evaluation 119 of risk, such as high risk, medium risk, or low risk, can be generated. The AI evaluation 119 can include evaluations of whether one or more specific risk factors indicate that the client is likely to engage or have engaged in laundering. The AI evaluation 119 of a risk factor can be determined based on one or more risk assessments 111 generated by the AI models 109. In some embodiments, one AI model 109 (such as AI Model 1) can be used to generate one risk assessment 111 (such as a number from 0 to 100 indicating increasing amounts of risk) for a risk factor, and an AI evaluation 119 will indicate that the risk factor is "Risky" if the AI assessment 111 is more than a threshold (such as 50). For example, if a risk factor is a number of companies owned or managed by the client, and if the client owns or manages a large number of companies, then the AI evaluation 119 can indicate that, at least for the specific risk factor, the client is high risk because of the client's ability to use multiple companies to move assets around. In some embodiments, the AI evaluation 119 can automatically update in response to a user selection of a risk factor 115 to show the AI evaluation 119 for the selected risk factor. A summary AI evaluation 119 can include a summary and overall likelihood that the client is or will participate in laundering. The summary can include, for example, which risk factors indicate that the client is likely to engage in laundering. The summary can also include examples of the data that indicates that the client is likely to engage in laundering. For example, the summary can show comparisons of the client to other people or groups, show data values related to the client that are outside of normal ranges or otherwise suspicious. As an example of an AI evaluation, an example indicator 309 of "Risky" or "Not risky" can be selected as shown in FIG. 3.

In a fourth portion of the user interface, an analyst evaluation 121 can be provided. The analyst evaluation can be provided for each risk factor. The analyst evaluation can additionally or alternatively be provided for the overall likelihood that the client is or will engage in laundering. An analyst can review the data 117 and the AI evaluation 119. Based on the analyst's review, the analyst can confirm or change the automatically evaluated risks. If the analyst confirms that the client is indeed a high risk client, then the organization can decline to engage with (or, in the current client context, decline to continue to engage with) the client. If the analyst changes the evaluation and indicates that the client is a low risk client, then the organization can engage with the client. As an example of an analyst evaluation 121, an analyst can select an example evaluation option 311 of "Risky" or "Not risky" as shown in FIG. 3, and the analyst may change the example AI evaluation indicator 309 in doing so (or there can be separate indicators for AI and analyst evaluations).

The risk evaluation including the AI evaluation 119, the analyst evaluation 121, and data for analyzing the risk factors can be stored in an archive 129. The risk evaluation can include indications of the databases 103 searched, the relevant data from the databases found as a result of a search, the AI models 109 used and the risk assessments 111, the risk factors 115, the data 117 for analyzing the risk factors, the AI evaluation 119, and the analyst evaluation 121, including whether the user confirmed or changed the AI evaluation 119. The archive data can be preserved, such as using block chain, distributed ledger, cumulative checksums, rewrite restrictions, encryption, or other technology to prevent later tampering.

The analyst evaluation 121 can be provided as feedback to the AI model modifier 125. For each risk factor 115 that the analyst evaluation 121 confirmed in AI evaluation 119, feedback can be used to update the corresponding AI model 109, such as by providing positive reinforcement feedback, changing coefficient values, adding a verified data sample and retraining the model, etc. For each risk factor 115 that the analyst evaluation 121 differed from the AI evaluation 119, feedback can be used to update the corresponding AI model 109, such as by providing negative reinforcement feedback, changing coefficient values, adding a verified data sample and retraining the model, etc.

In some cases, the analyst can review the data 117 for analyzing each risk factor in view of new training, new realizations, and/or new insights. The analyst's decision making process can change over time and adapt as clients develop new strategies for hiding their indications of engaging in illegal activity such as laundering. Accordingly, the AI models 109 can be dynamically updated over time based on feedback such that the AI evaluations 119 and approvals 127 remain accurate over time, even as tactics change.

Example User Interfaces

The system described in FIG. 1 can be used to assess and evaluate a client for a risk of illegal activity. FIG. 2 through FIG. 8 show examples of user interfaces for analyzing a client for a risk of laundering. Some of the risk analysis discussed with respect to FIG. 2 through FIG. 9 can be performed, for example, using the AI models 109 of FIG. 1. The user interfaces shown in FIG. 2 through FIG. 8 are examples of user interfaces 113 (or parts thereof) shown in FIG. 1. It will be understood that the analysis and technology discussed with respect to FIG. 2 through FIG. 8 can also be performed and detect low risk clients, such as described with respect to block 127 of FIG. 1, without generating one, some, or all of the user interfaces shown in FIG. 2 through FIG. 8. Furthermore, although the examples are provided with respect to evaluating clients for a risk of laundering, it will be understood that the technology can be extended to evaluating clients for other risks.

Figure 2:
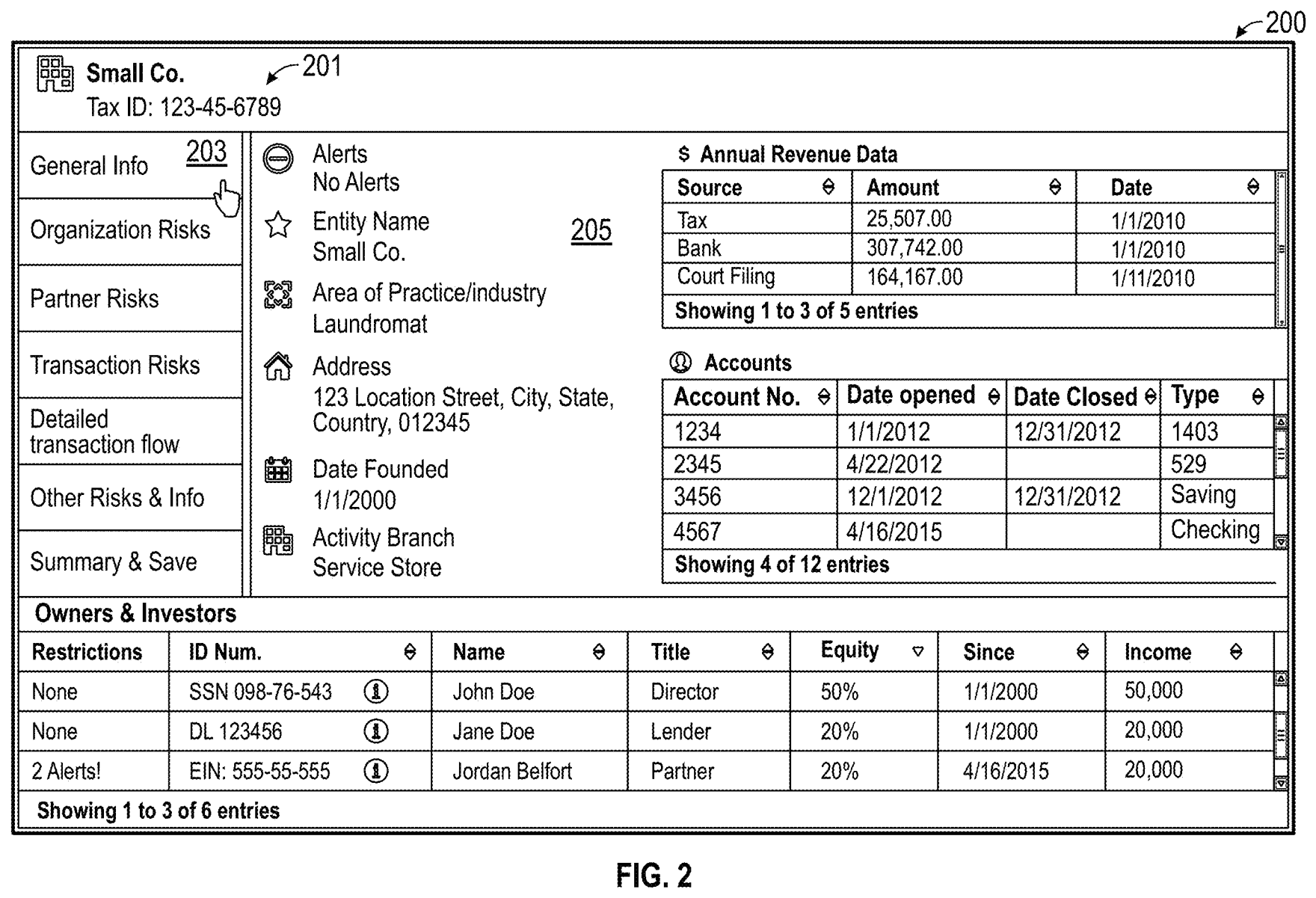

FIG. 2 shows an example of user interface 200 for evaluating the risk of client participation in illegal activity. The interface 200 includes inputs 201 allowing for an entity type, name, and/or identification number to be entered and searched (such as by using the search module 101 of FIG. 1). A navigation menu 203 includes selectable indicators to show general information about the searched client and various classes of risk indicators, such as organization risks, partner risks, transaction risks, and other risks. A display area 205 can update to dynamically display information in responses to user selections in the menu 203. In the example, the "General Info" is selected, and the display area 205 shows general information about the searched entity "SmallCo." The display area 205 shows registration information, annual revenue data, account data, and owners and investors of SmallCo.

The navigation menu 203 can be interacted with to show different risk indicators. For example, as shown in FIG. 3, when "Organization Risks" is selected, related data from databases can be used for dynamically updating the display area 305 to show visualizations of data relating to organization risks. Also, as shown in FIG. 3, the navigation menu can also show indications of risk factors relating to "Organization Risks." Similarly, when "Partner Risks" is selected in FIG. 2, the user interface 500 of FIG. 5 can be displayed in place of the display area 205 along with indications of partner-specific risk factors. Similarly, when "Transaction Risks" is selected in FIG. 2, the display area 605 of FIG. 6 can be displayed in place of the display area 205 along with indication of transaction-specific risk factors. The menu 203 of FIG. 2 can include any additional number of risk categories and/or risk factors that can be interacted with to display other user interfaces, such as shown in FIG. 7. When "Summary & Save" is selected from the menu 203, the user interface 800 of FIG. 8 can be displayed.

The display area 205 shows general information about the searched entity "SmallCo." An area showing registration information can include alerts for the entity (such as travel restrictions, bank restrictions, warrants, sanctions, trade restrictions, evaluated risks of laundering, etc.), the entity name, area of practice or industry that the entity is engaged in, an address, date founded, and other information.

The area showing annual revenue data can include a table or other visualization of data such as revenue amounts, dates, and sources of the data, which can come from one or more different databases. In some cases, the different revenue sources can come from different databases. For example, a database of tax or securities filings can be searched to report a first amount of revenue, a database of bank transactions can be searched to report a second amount of revenue, and a third database of court filings can be searched to report a third amount of revenue. The data from the different databases can be simultaneously shown in proximity to each other so that inconsistencies can be more easily recognized by an anlyst. Otherwise, an analyst performing manual review most often will not recognize the inconsistencies when reviewing massive amounts of data. Also, when different analysts are assigned to review the different databases in an attempt to expedite review speed, none will recognize the inconsistency with other databases. The example table allows for easy recognition of significant discrepancy between transactions reported by the client for tax documents and transactions reported by a bank, indicating a likelihood of laundering.

The area showing account data can include a table or other visualization of data such as accounts of the entity with various institutions (such as checking or saving accounts), along with data about the date opened, date closed, balances, etc. Abnormal amounts of accounts and/or abnormal timings of accounts can indicate a likelihood of laundering.

The area showing owners and investors can include a table or other visualization of data such as the owners, partners, lenders, equity holders, and/or other beneficiaries of the entity. Data such as identification numbers, names, titles, amount of equity, and income for the owners and investors can also be collected from one or more databases and displayed. This can allow for recognition and familiarity of the owners and investors. Furthermore, due to the simultaneous showing and/or proximity of the data (e.g., on a same screen), suspicious patterns can be detected. For example, the area of practice is indicated as a laundromat, which is a cash-service industry. The income of the owners can be compared to models of what is typical for that type of industry. For example, it can be recognized that laundromats usually are smaller investment projects that do not require multiple owners or investors, and that the income of each owner or investor in the project can be compared to what is typical for the area of practice. The multiple investors shown can indicate a likelihood of laundering, as well as a mismatch between income and reported tax data.

FIG. 3 shows an example user interface 300 for analyzing organization risk factors. The user interface 300 includes a menu 303 that can expand to show a plurality of indicators of individual risk factors in response to a user interaction with "Organization Risks." The display area 305 can update to show data for analyzing each risk factor 307, an example AI evaluation indicator 309 of each risk factor, and provide for an example analyst evaluation option 311 of each risk factor.

In the menu 303, the individual risk factors (e.g., Risk Factor 1 through Risk Factor N, where N can be any number) can be automatically color coded based at least in part on a risk assessment and/or an AI evaluation of the risk factor. For example, a risk factor can be indicated with a color code ranging from green to red on a color spectrum based on a risk assessment used for evaluating the risk factor. As another example, a risk factor can be color coded as green if an AI evaluation for the risk factor is low risk, yellow if an AI evaluation for the risk factor is unknown or moderate risk, and red if an AI evaluation for the risk factor is high risk. Other visual indicators, such as symbols, patterns, or stylizing can also be used. Other visual indicators can include arranging the risk factors from highest risk to lowest risk. The visual indicators can allow an analyst to quickly focus on the more critical data. The analyst can, in some embodiments, skip reviewing data related to risk factors that were determined by the AI evaluation to be low risk, saving substantial amounts of time. Accordingly, an analyst can focus attention on the more critical data for a greater number of clients being investigated and make more accurate evaluations.

In the display area 305, data for analyzing each individual risk factor can be displayed. For example, Risk Factor 1 can be "Recent Corporate Changes" and data for analyzing this risk factor can include the table and timeline shown in FIG. 3. Some recent corporate changes can indicate an increased likelihood of laundering, especially if the client is newly associated with high risk individuals. The table can show any alerts or restrictions for the associated individuals. The alerts can be of record in databases and/or generated by an evaluation (such as analysis described with respect to FIG. 1 through FIG. 9) of each associated individual. The data for analyzing "Recent Corporate Changes" can also show, in the table and/or in a timeline, the times where individuals associated with the entity changed. Due to the simultaneous and/or proximate display of information, it can be seen that two individuals flagged with alerts and took a combined 100% equity from 2015-2016, indicating higher risks around or after this time frame.

For each risk factor in the display area, AI evaluation indicators of the risk factor and analyst evaluation options of the risk factor can also be shown. The AI evaluation can automatically indicate a result generated based at least in part on the output of one or more AI models. For example, an indication of "Risky" or "Not Risky" can be automatically selected to indicate the AI evaluation.

An analyst can enter an analyst evaluation 313, such as by confirming or selecting the other of "Risky" or "Not Risky." The analyst evaluation 313 can also include freely typed comments. The analyst evaluation 313 can also include one or more pre-populated reasons for confirming or changing the evaluation. The pre-populated reasons can change depending on the analyst's selected evaluation and change depending on whether or not the analyst evaluation is different from the AI evaluation. The pre-populated reasons can also be different for each risk factor and serve to remind the analyst of various reasons to consider when evaluating the presented data. In some embodiments, when the analyst evaluation is entered, the color coding of the associated risk factor can update. For example, if Risk Factor 1 in the menu 303 is green because the AI evaluation of Risk Factor 1 indicates low risk, then Risk Factor 1 in the menu 303 can change to red when the analyst changes the evaluation to high risk.

The example display area 305 also includes data for analyzing a second risk factor, such as Risk Factor 2. In some embodiments, the data for analyzing risk factors can be individually displayed in the display area 305 in response to a selection of a specific risk factor from the menu 303. In some embodiments, the data for analyzing a plurality of risk factors can be simultaneously shown in the display area 305, and selecting a specific risk factor from the menu 303 can cause the corresponding data for analysis to appear in focus in the display area 305, such as by scrolling to the corresponding data.

An example of a second risk factor is whether or not there are changes to addresses. Businesses and people usually keep their addresses for longer periods of time, and more frequent changes can indicate a higher risk of laundering. An AI model can be configured to analyze the frequency of address changes of the client in comparison to other similar entities. The display area can also show or include links to show street views of the address and/or a map of the address. This can allow the analyst to see if the addresses are in typical locations for people/businesses and/or evaluate if the street view shows an actual residence or building. If not, then the address can be suspect, and the risk factor can indicate a higher risk of laundering.

FIG. 4 shows an example user interface 400 with additional data for analyzing organization risk factors. The examples can be shown, for example, in the display area 305 of FIG. 3, and can correspond to other risk factors in the menu 303 of FIG. 3.

Risk factors such as "Same Addresses as Other Entities," "Same Phone Numbers as Other Entities," and/or same identifiers (such as tax identifiers, registration numbers, emails, etc.) as other entities can be used to determine a risk of money laundering. An AI model can be configured to analyze data to determine increased likelihoods of laundering when more addresses, phone numbers, and/or identifiers of the client are shared with other entities. This can be the case when, for example, a money launderer uses a plurality of entities to move assets around while using a single physical address, phone number, email, or other identifier for ease of coordination and management. The user interface 400 can show one or more tables or visualizations of the addresses, phone numbers, or identifiers associated with the client and, for each entity having a phone number, address, or identifier that matches the client, one or more of: notes about problems or alerts for the entity, an ID (such as a tax number, registration number, social security number, etc.) for the entity, a name of the entity, a description of the entity, a field of practice or occupation of the entity, a category of the entity, and/or other data. The visualization can also show a number of entities matching each address, phone number, and/or identifier associated with the client. The information can be shown simultaneously and/or proximately to each other.

In the illustrated example, the addresses associated with the client matches 101 other entities, and the phone numbers associated with the client matches 121 other entities. An AI model can be configured to determine, for example, that based on the large number of matching entities, the client has a higher risk of engaging in laundering.

An analyst can be configured to analyze the presented data. For example, a shopping center or mall may have a general address used by a plurality of stores located within the shopping center or mall, and this can be the case without raising suspicion. As another example, an analyst may recognize that a headquarters of a large company may have a phone number that is shared with subsidiaries of the same company, or that a dedicated call center may provide support for a number of different companies. The analyst can review the AI evaluation 411 and confirm or change the evaluation. The analyst can also provide comments, reasons, or other analysis about the analyst's evaluation 413. Although one AI evaluation 411 and one analyst evaluation 413 option is shown for the combination of phone numbers and addresses, in some embodiments, there can be separate evaluation options.

FIG. 5 shows a user interface 500 including data for analyzing risk factors related to partners of a client. The examples can be shown, for example, in the display area 305 of FIG. 3, and can correspond to risk factors under the class of "Partner Risk" in the menu 303 of FIG. 3. When the "Partner Risk" option is selected in the menu 303 of FIG. 3, a plurality of the risk factors (e.g., Risk Factor 1 to M, where M is any number, similar to what is shown in FIG. 3) related to Partner Risk can appear, along with color coded (or other visual) indicators of each risk factor.

The user interface 500 includes data for analyzing a first risk factor, "Unusual Partner Data." The data can include a table and/or other visualizations comparing demographic data about the partners, investors, or beneficiaries of the client. An AI model can be configured to analyze people investors of different business and perform a comparison of income data for the partners, investors, or beneficiaries of the client to partners, investors, or beneficiaries of similar demographics. Demographic information can include, for example, age, education, location, etc. In the example, the age of each person is shown in comparison to average ages of typical partners in the laundromat business with similar backgrounds. It can be seen that the ages are typical or within a reasonable variation, otherwise laundering may be indicated by using unusual people (such as children too young to invest in businesses) to facilitate transactions. The income of each person is also shown in comparison to average incomes of typical partners in the laundromat business with similar backgrounds. It can be seen that the incomes of Jane Doe and John Doe are within a reasonable variation of owners of laundromats in view of fractional equity, but Jordan Belfort and Al Capone are associated with incomes far in excess of typical laundromat owners, even accounting for or regardless of age and education. If an AI model determines a high risk for this risk factor, an analyst can review the data and confirm the high risk, noting the unusual incomes as risk factors.

The user interface 500 also includes data for analyzing a second risk factor, "Suspicious Extended Relationships." The user can select a number of degrees of connections to analyze, which is currently shown as 4. Based on the number of selected degrees, connections of the client can be determined and displayed. For example, for the selected client SmallCo., the first degree can be the investors, partners, and beneficiaries of SmallCo. and/or entities that are business partners with, have a parent or subsidiary relationship with, a supply or purchase relationship with, or other type of association with SmallCo. The second degree of connections can include entities, investors, partners, and beneficiaries further associated with the entities, investors, partners, and beneficiaries from the first degree of connections. Connected entities, investors, partners, and beneficiaries may be collectively referred to as "connected entities."

The members of each degree of connections can be shown in a table 511, nested menu 513, web 515, or other visualization, along with one or any combination of: restrictions, alerts, notes, names, identification numbers, industry, title, dates of participation or founding or birth, addresses, contact info, the type of association used to determine the connection relationship, or other information. Additionally, visual indications (such as colored circles) can be used to flag the connected entities for various situations. The flags can indicate if there are any analyst notes about or restrictions against a connected entity. The flags can also indicate if a connected entity is a previously rejected client, such as based on an AI evaluation or analyst evaluation performed in the past. The flags can also indicate if a connected entity is a public figure, such as a politician or celebrity. For example, databases and/or the internet can be searched to determine if the entity was reported in news sites, government databases, top listed search pages, popular social media sites, etc. The flags can also indicate if the connected entity is a foreign entity. An AI model can be configured to search for and analyze the connected entities of a client and determine the flags for the connected entities.

In the example shown in the user interface, a nested menu 513 shows connected entities of the client being analyzed. A connected entity in the nested layer can be selected to reveal a next degree of connection that includes people. Furthermore, in response to the selection, the web can be displayed and/or updated to show equity, association, or relationship between the selected entity and the next degree of connected entities, including indicators of the amount of equity, association, or relationship. The web 515 can use different icons to indicate people, businesses entities, etc. The web can also be used to determine if the partners of the client also have equity in other entities that have a relationship with the client. The web can also be used to easily see if the client moves assets through various connections back to the same client and/or accounts or entities owned by the same people, for example, if the web shows a plurality of links that circle back to the same entities.

By reviewing the data provided for analyzing suspicious extended relationships and the interactive web and nested menu, an analyst can make an evaluation about whether or not the data indicates a risk of laundering.

Other examples of data that can be shown in the user interface include: data about connected entities, the experience of connected entities, the age of connected entities, the income of connected entities, the addresses or citizenships of connected entities, equity of connected entities, dates of transactions or changes in equity of connected entities, corporate changes of the connected entities, etc. Furthermore, average, normal, or statistical distributions of the same types of data can be shown to provide a reference for comparison. The average, normal, or statistical distribution of data can be used to assist the analyst or AI models in determining unusual relationships.

FIG. 6 shows an example user interface 600 for analyzing risk factors related to transaction risk. The interface 600 includes inputs 601 allowing for an entity type, name, and/or identification number to be entered and searched (such as by using the search module 101 of FIG. 1). A navigation menu 603 includes selectable indicators with "Transaction Risks" selected and a plurality of risk factors related to transaction risks. A display area 605 is updated to dynamically display data for analyzing the transaction risks. The example risks factors related to transaction risks include internal versus reported revenue consistency, revenue consistency with industries, transactions in unusual regions, and other risk factors, such as transactions with types of entities.

The display area 605 includes data for a risk factor based on internal versus reported revenue consistency. This can include data from two different sources or different databases, for example, an external database of taxes reported by the client and an internal database of transactions processed for or with the client. Other examples of databases include databases from financial institutions, shipping databases, customs databases, etc. The data for analysis can be dynamically presented for a default time period. The time period can be changed by the analyst, and the displayed data can update in response. The example data shows that the reported transactions are inconsistent with and substantially less than the transactions sent and received. The data for analysis can be shown in a table and as a graph or other visualization. An AI model can be configured to determine which sources and time periods of revenues to compare for evaluating a likelihood of laundering. The sources and time period selected by the AI model can be presented as the default sources and default time period for analysis. An analyst can review the data for different sources and/or different time periods and provide an analyst evaluation. The analyst's decision may recognize situations where inconsistencies are normal, such as when figures from a less inclusive database are lower than figures from a more inclusive database, the figures from a report are calculated according to a different standard, etc. Based on the displayed data, the AI and/or analyst can recognize that the reported transactions are the net value of the transactions instead of an actual amount of transactions, and appropriate evaluations can be made.

The display area 605 can also include data for analyzing the client's transaction consistency with an industry. Transactions for various types of industries or entity types can be compiled, visually presented, and compared to the transaction data determined for the client. For example, the data shows that typical laundromats receive transactions valued at an average of 35,739, but the client's received transactions are valued at 8.6 times this amount. Data for other similar or related categories, such as cleaners, can also be shown for reference. An analyst can select to view transactions sent, received, or both, and the data can be dynamically updated based on the analyst's selection. As shown, the transactions, regardless of sending or receiving, show comparatively excessive sending and receiving of transactions by the client. This is apparent even though the client's net transaction value (25,507) is correctly reported for taxes and within a reasonable range for laundromats. The AI model can provide an evaluation, and an analyst can confirm or revise the evaluation and enter comments based on the data about the client's transaction consistency with similar industries.

The display area 605 can also include data for analyzing the client's transaction with entities in unusual regions. One or more databases can be used to analyze a distribution of transactions and geographic locations associated with the transactions. The data can be displayed in a visualization such as a map, table, graph, web, etc. An AI model can be configured to associate certain geographic locations and/or average transaction distances for certain types of clients with increased likelihoods of laundering. For example, most entities typically transact with other local people or businesses. Transactions across farther distances, foreign countries, and/or certain places such as tax havens can indicate higher likelihoods of laundering. The geographic distribution of the client's transactions can be compared to the geographic distributions of other similar entities. An analyst can review the data and provide an analyst evaluation to confirm or change an AI evaluation, as well as provide comments.

The display area 605 can also include a visualization of data for analyzing other risk factors associated with transactions (not shown). For example, one or more databases can be used to analyze a distribution of types of entities that a client transacts with. An AI model can be configured to compare the distribution for the client with distributions for other similar entities. For example, databases can be analyzed to compile, for similar laundromats with low risks of laundering, a percentage of types of entities typically transacted with. The distribution can indicate, for example, that low risk laundromats typically have 25% of their transactions (by volume or value) with landlords or real estate companies, 25% with appliance suppliers, 25% with repair services, and 25% with other categories. This can be compared to the transactions of the client, which may be, for example, 2% with a landlord, 2% with an appliance supplier, 2% with repair services, and 94% with financial institutions, trusts, and banks. An AI model can, based on the disparity, determine a high likelihood of laundering. The data can be visually displayed for an analyst who can confirm or change the evaluation (for example, if a new laundromat just opened after securing bank loans and has not opened for business).

The display area 605 can also include a visualization of data for analyzing other risk factors associated with transactions (not shown). For example, one or more databases can be used to analyze an amount of transactions. Often, anti-laundering enforcement agencies require reporting of transactions over a certain value, such as 10,000. Accordingly, AI models can be configured to assess an usually large proportion of transactions just below the reporting requirement, such as 9,500, as high risk or an even more unusually larger proportion of transactions of even smaller amounts as high risk. Additionally or alternatively, an AI model can be configured to, based on a frequency, volume, and average size of transactions by the client in comparison to other entities, assess a risk of laundering. For example, if most laundromats typically make cash daily deposits of coins in the range of a few hundred but less than one thousand, but the client typically makes multiple deposits of 1,000 to 2,000 (well below the reporting requirement), then the AI model can still flag a high risk of laundering. As another example, the method of making transactions (such as in person transactions, transactions made with automated machines, or transactions made online) by the client can be compared to the behavior of other entities, as launderers may often avoid making transactions in person to avoid showing identification.

FIG. 7 shows an example user interface 700 with additional data for analyzing risk factors related to transaction risk. The examples can be shown, for example, in the display area 605 of FIG. 6, and can correspond to one of the "other risk factors" in the menu 603 of FIG. 6.

In the user interface 700, data for analyzing the risk factor "Transactions with High Risk Entities" can be shown. An AI model can be configured to analyze data to determine entities that the client transacted with. Data from a default date range determined to be of interested by the AI model can be shown, as well as data from some or all databases determined to be of interest by the AI model. An analyst can select different date ranges and/or databases. The analyst can select transactions sent, received, or both for analysis. The analyst can also filter out certain types of transactions. The data shown in the user interface 700 can automatically update in response to the analyst's selections.

A visualization, such as a table, graph, and/or other visualizations, can display one or more of: entities that the client transacted with, identification numbers of the entities, names of the entities, direction of transactions, value of transactions, percentage of overall transactions, and other data can be shown.

A web can show certain types of transactions, such as top transactions by value, top transactions by percent of total transactions, transactions sent and/or received, transactions from certain databases, and/or transactions from entities within certain degrees of connections to the client. One or more databases can be searched to generate the web, which can represent entities with icons (such as to distinguish people and companies). The icons can be further distinguished to indicate (such as using color or different icons) people or entities flagged as high risk. Accordingly, an analyst can easily see if the client transacts with other high risk entities. The direction of net transaction flow can be indicated on the links between icons, and the links can also indicate a value or percentage of the transaction. An analyst can interact with the web to rearrange the icons, zoom in or out, and perform other manipulations. Based on the data shown in the user interface, an analyst can confirm or change an AI evaluation of risk based on transactions with high risk entities.

Figure 8:
FIG. 8 shows an example user interface for summarizing AI and analyst evaluations.

FIG. 8 shows an example user interface 800 for summarizing AI and analyst evaluations. A display area 801 can show an indication of a number 803 of risk factors deemed high risk for the client (displayed as AI evaluation/analyst evaluation), an indication of a number 805 of risk factors deemed low risk factors (displayed as AI evaluation/analyst evaluation), a number 807 of risk factors assessed by the analyst without providing a reason, and a number 809 of times that the analyst changed the evaluation that was made by the AI model.

The numbers of high risk or low risk AI evaluations can include all of the risk factors evaluated by the AI. In some embodiments, AI evaluations may not be presented for every risk factor. For example, AI models may not analyze some types of images, and data for analyzing a risk factor based on a street view of address of or a website of the entity can be provided to an analyst for an analyst evaluation without an AI evaluation or AI assessment. If the AI evaluates all risk factors before presenting data to the analyst, then the total number of high risk and low risk evaluations can account for all risk factors evaluated by an AI model. The total number of high risk and low risk evaluations by the analyst can be lower if the analyst has not evaluated all risk factors, for example, if the analyst skipped over risk factors deemed low risk by the AI evaluation in order to save time.

For all or some (such as the high risk) risk factors, a table 811 can summarize the class of risk, the specific risk factor evaluated, the AI evaluation of the risk factor, the analyst's evaluation of the risk factor, analyst comments, and a prepopulated reason selected by the analyst. The summary can show data for all risk factors, for the risk factors evaluated by the analyst, or for the risk factors evaluated to be high risk.

Buttons at the bottom can present options to approve the client, decline the client, and to save and archive the data. The buttons to approve the client can be selectable, in various embodiments, after an analyst reviews and provides an evaluation of all risk factors or at least all risk factors initially flagged as high risk by the AI models. In some embodiments, if a certain number or combination of risk factors are flagged as high risk by the AI models and/or the analyst, then the approve client option may not be available. In some embodiments, an approval or rejection for the client can be automatically performed based on the AI evaluations and/or analyst evaluations when the "Save and Archive" button is selected. Selecting to save and archive can cause the data for evaluating the risk factors, such as shown in FIG. 2 through FIG. 7, as well as the summary data shown in FIG. 8, to be archived in a database.

AI models and analysts can evaluate additional risk factors, and data can be presented for analyzing the additional risk factors. For example, whether a client or related entity operates on certain exchanges can be flagged. As another example, the internet or registration databases can be searched to determine whether the client or related entity has a website typical for people or similar businesses. The website can be reviewed by the AI model and/or analyst to see if the website is a bona fide website or just a placeholder. The absence of a website or bona fide website can indicate a higher likelihood of laundering. The client or related entity can be checked for registrations and/or licenses for their field of practice or industry as compared to other similar entities. The absence of a license or registration can indicate a higher likelihood of laundering. Being in and/or having relationships with entities in certain fields of practice can indicate a higher likelihood of laundering. Mentions of the client and/or related entities in the press and/or political forums can indicate a higher likelihood of laundering. Accordingly, there can be more risk factors for AI model evaluation and/or analyst evaluation.

Example Flowchart

Figure 9:
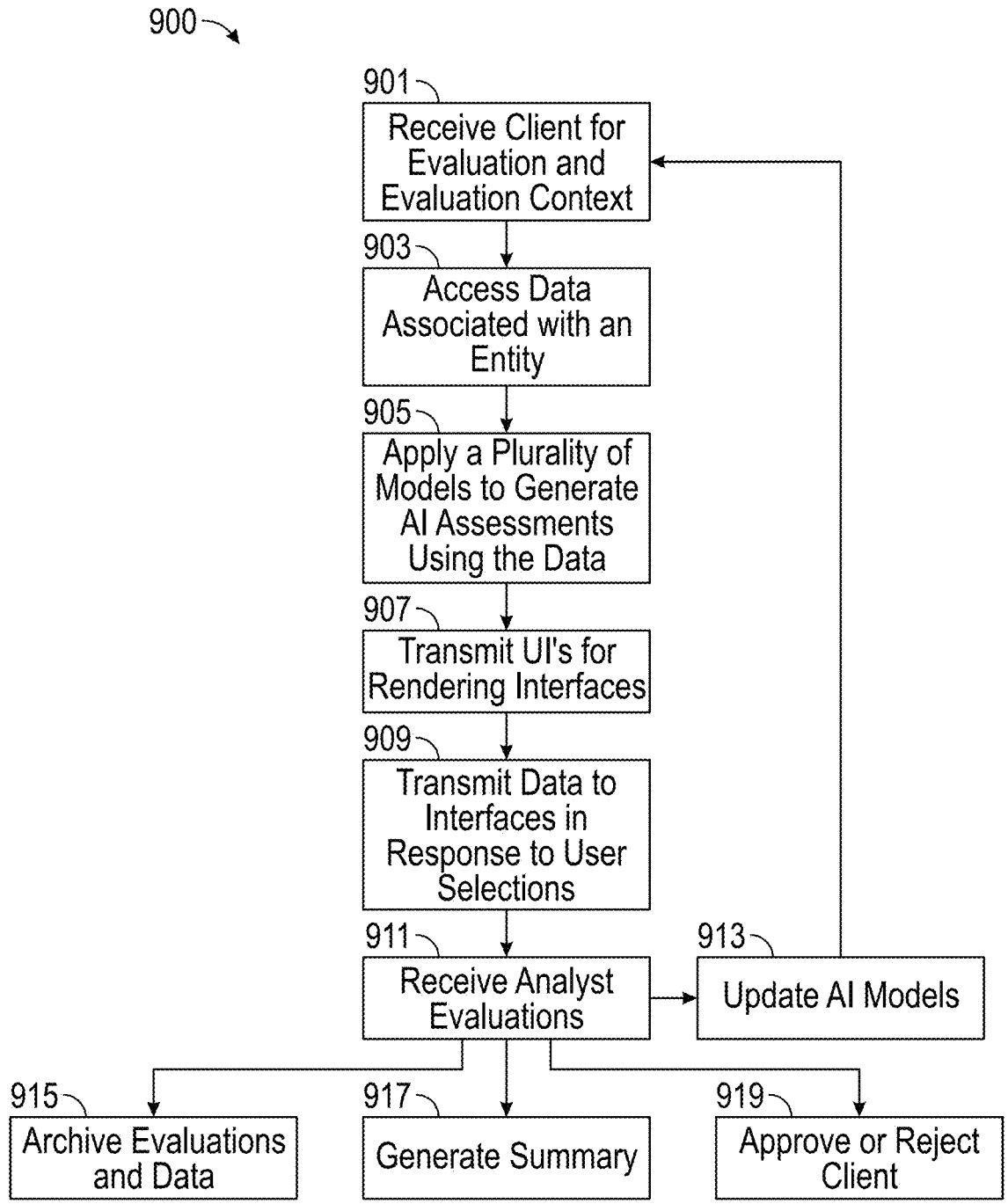
FIG. 9 shows an example flowchart of a method for using AI and user interfaces to prevent association with clients who are high risk for participating in illegal activity.

FIG. 9 shows an example flowchart 900 of a method for using AI and user interfaces to prevent association with clients who are high risk for participating in illegal activity.

At block 901, a client is received for evaluation in an evaluation context. The client name or other identification can be received and provided to a system. In a first example context, information about a new client can be received in a new client context. In a second example, an existing client can be randomly, periodically, routinely, or algorithmically selected as part of a client checkup context.

At block 903, data associated with an entity can be accessed. The data can be data useful for analysis by one or more AI models. The data can be accessed from one or more databases and/or the internet, such as shown in FIG. 1. The databases that are accessed can depend on the context. For example, an internal database of historical transactions with the client may include useful data in the context of new clients, but the internal database of historical transactions with the client can be accessed in the context of an existing client.

At block 905, a plurality of AI models can be applied to the data to generate a plurality of AI assessments and/or evaluations. The AI models used can depend on the context. For example, AI models that generate evaluations using data about internal transactions with the client (such as shown in FIG. 6) can be used in the existing client context but not used in the new client context because new clients will not have any history of internal transactions.

At block 907, data for displaying one or more user interfaces can be transmitted. The user interfaces can include a first portion showing risk factors, a second portion showing data for analyzing the risk factors, a third portion showing an AI evaluation of the risk factor, and/or a fourth portion allowing for an analyst to provide an evaluation of the risk factor. The portions can be displayed simultaneously and/or on the same screen. Example user interfaces and portions thereof are shown in FIG. 2 through FIG. 8. The risk factors can depend on the context. In some embodiments, different risk factors and/or different numbers of risk factors can be displayed depending on the context.

In some embodiments, block 907 can be performed if one or a combination of AI assessments and/or evaluations indicates high risk, otherwise block 905 can proceed to blocks 915, 917, and 919. For example, in a new client context, a client can be approved at block 919 if all or most AI assessments and/or evaluations indicate low risk. As another example, in a checkup context, no alert is generated for clients assessed by an AI to be low risk, but an analyst can be alerted using the user interface transmitted at block 909 to review data for a client indicated to be high risk in one or a combination of AI assessments or evaluations.

At block 909, data to update the user interfaces can be transmitted. The data can be generated in response, for example, to a user selection of a risk factor, a user selection of different data for analysis, etc. In response, a visualization of data for analyzing a risk factor can be updated.

At block 911, an analyst evaluation of a risk factor can be received. The analyst evaluation can also include comments and/or reasons. Analyst evaluations can be received for a plurality of risk factors and may change or override the AI evaluation for the risk factor.

At block 913, based on an analyst evaluation of a risk factor, one or more AI models used for evaluating the risk factor can be updated using the analyst's evaluation as feedback. The feedback can reinforce (positively or negatively) the AI model, act as a new verified data point for retraining the AI model, cause the AI model to update with a new path or grouping, change coefficients used in the AI model, etc. The AI model can also update based on a prepopulated reason selected by the analyst. For example, if an analyst selects a reason that the AI model did not evaluate enough data, evaluated too much data, or evaluated irrelevant data, then the AI model can be updated to evaluate different data.

At block 915, the evaluations of the analyst and/or the AI can be archived. The data for analyzing risk factors can also be archived. In some embodiments, the aggregate results (such as total transaction figures shown in FIG. 6) of the data (such as the data reviewed by the analyst) can be archived. In some embodiments, the underlying data (such as each available transaction record contributing to a total transaction value shown in FIG. 6) used to generate aggregate results can be archived.

At block 917, a summary of evaluations can be generated. An example summary of evaluations is shown in FIG. 8. The summary of evaluations can include AI evaluations of risk factors, analyst evaluations of risk factors, comments, and/or reasons.

At block 919, the client can be approved if low risk or rejected if high risk. The approval or rejection can include, for example, sending a notification to an individual or computer device. A rejection can include, for example, denying a sale, transaction, service, or relationship. An approval can include, for example, performing a next step of a sale, transaction, service, or relationship. In an existing client context, a rejection can include terminating a relationship or account with a client or preventing future transactions, sales, or services with the client.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 10, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
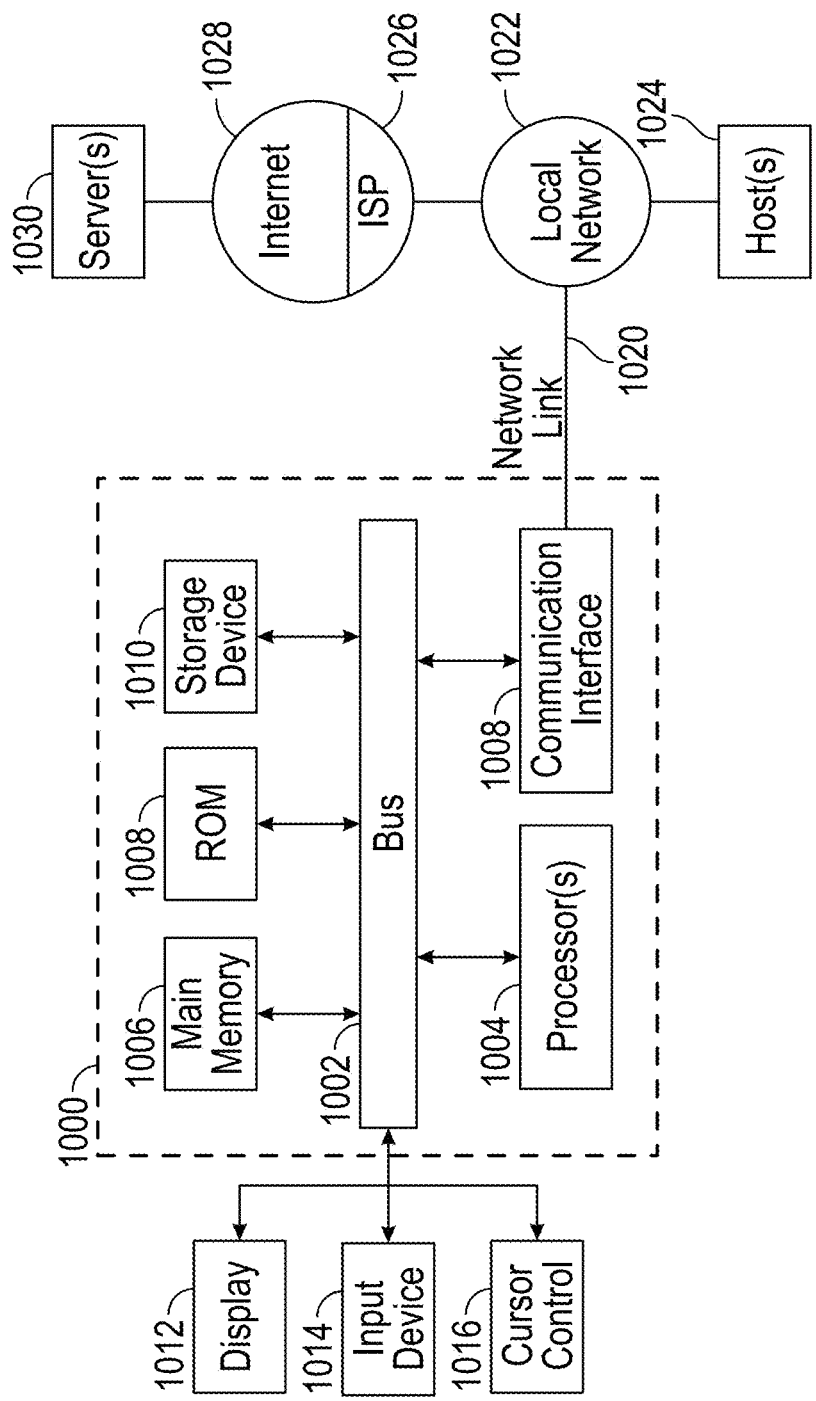
FIG. 10 is a block diagram that illustrates a computer system upon which various embodiments may be implemented.

For example, FIG. 10 is a block diagram that illustrates a computer system 1000 upon which various embodiments may be implemented. Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions.

Computer system 1000 may be coupled via bus 1002 to a display 1012, such as a cathode ray tube (CRT) or LCD display (or touch screen), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as computer executable program instructions that are executed by the computing device(s). Computer system 1000 may further, as described below, implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more computer readable program instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising:
one or more computer readable storage devices configured to store computer readable instructions; and
one or more processors configured to execute the computer readable instructions to cause the computer system to perform operations comprising:
receiving an indication of an entity from a user via a graphical user interface;
accessing data associated with the indicated entity;
generating, based on the accessed data, a plurality of risk assessments corresponding to a plurality of risk factors associated with the entity;
receiving, via the graphical user interface and from the user, a user selection of a risk factor of the plurality of risk factors;
presenting, in response to receiving the user selection of the risk factor, and via the graphical user interface:
a risk assessment, of the plurality of risk assessments, corresponding to the risk factor, and
a user evaluation option for the risk factor;
receiving, via the graphical user interface and from the user, a user interaction with the evaluation option indicating a user evaluation of the risk factor;
in response to receiving the user evaluation of the risk factor, generating a combined risk assessment based on a combination of the plurality of risk assessments and the user evaluation of the risk factor; and
causing presentation, via the graphical user interface, of the combined risk assessment.

2. The computer system of claim 1, wherein the one or more processors are configured to execute the computer readable instructions to cause the computer system to perform further operations comprising:
in response to receiving, via the graphical user interface, a selection of a first risk assessment of the plurality of risk assessments, causing display of data associated with the first risk assessment.

3. The computer system of claim 2, wherein the data associated with the first risk assessment comprises a graphical visualization including at least one graph, table, web, or chart.

4. The computer system of claim 3, wherein at least one of:
the web indicates relationships between the entity and other entities, wherein the web is dynamically configurable by the user to adjust a number of degrees of connections in the web;
the chart or the table indicates comparisons of transaction data reported by the entity against transaction data compiled from one or more databases of transactions by the entity; or
the chart provides a visualization including a comparison or a breakdown of categories of transactions.

5. The computer system of claim 1, wherein the one or more processors are configured to execute the computer readable instructions to cause the computer system to perform further operations comprising:
receiving, via the graphical user interface and from the user, an evaluation of the combined risk assessment.

6. The computer system of claim 1, wherein the one or more processors are configured to execute the computer readable instructions to cause the computer system to perform further operations comprising:
comparing the combined risk assessment to a threshold; and
in response to determining the combined risk assessment does not satisfy the threshold, approving the entity.

7. The computer system of claim 1, wherein the one or more processors are configured to execute the computer readable instructions to cause the computer system to perform further operations comprising:
comparing the combined risk assessment to a threshold; and
causing presentation of the combined risk assessment in response to determining the combined risk assessment does satisfy the threshold.

8. The computer system of claim 1, wherein the presented combined risk assessment includes detailed information associated with the entity.

9. The computer system of claim 1, wherein the presented combined risk assessment includes a table summarizing the plurality of risk assessments and the evaluations of the risk factor.

10. The computer system of claim 1, wherein generating the combined risk assessment comprises generating a weighted combination of the plurality of risk assessments.

11. A computer-implemented method comprising:
by one or more processors executing computer readable instructions:
receiving an indication of an entity from a user via a graphical user interface;
accessing data associated with the indicated entity;
generating, based on the accessed data, a plurality of risk assessments corresponding to a plurality of risk factors associated with the entity;
receiving, via the graphical user interface and from the user, a user selection of a risk factor of the plurality of risk factors;
presenting, in response to receiving the user selection of the risk factor, and via the graphical user interface:
a risk assessment, of the plurality of risk assessments, corresponding to the risk factor, and
a user evaluation option for the risk factor;
receiving, via the graphical user interface and from the user, a user interaction with the evaluation option indicating a user evaluation of the risk factor;
in response to receiving the user evaluation of the risk factor, generating a combined risk assessment based on a combination of the plurality of risk assessments and the user evaluation of the risk factor; and causing presentation, via the graphical user interface, of the combined risk assessment.

12. The computer-implemented method of claim 11 further comprising:
by the one or more processors executing computer readable instructions:
in response to receiving, via the graphical user interface, a selection of a first risk assessment of the plurality of risk assessments, causing display of data associated with the first risk assessment.

13. The computer-implemented method of claim 12, wherein the data associated with the first risk assessment comprises a graphical visualization including at least one graph, table, web, or chart, and wherein at least one of:
the web indicates relationships between the entity and other entities, wherein the web is dynamically configurable by the user to adjust a number of degrees of connections in the web;
the chart or the table indicates comparisons of transaction data reported by the entity against transaction data compiled from one or more databases of transactions by the entity; or
the chart provides a visualization including a comparison or a breakdown of categories of transactions.

14. The computer-implemented method of claim 11 further comprising:
by the one or more processors executing computer readable instructions:
receiving, via the graphical user interface and from the user, an evaluation of the combined risk assessment.

15. The computer-implemented method of claim 11 further comprising:
by the one or more processors executing computer readable instructions:
comparing the combined risk assessment to a threshold; and
in response to determining the combined risk assessment does not satisfy the threshold, approving the entity.

16. The computer-implemented method of claim 11 further comprising:
by the one or more processors executing computer readable instructions:
comparing the combined risk assessment to a threshold; and
causing presentation of the combined risk assessment in response to determining the combined risk assessment does satisfy the threshold.

17. The computer-implemented method of claim 11, wherein the presented combined risk assessment includes detailed information associated with the entity.

18. The computer-implemented method of claim 11, wherein the presented combined risk assessment includes a table summarizing the plurality of risk assessments and the evaluations of the risk factor.

19. The computer-implemented method of claim 11, wherein generating the combined risk assessment comprises generating a weighted combination of the plurality of risk assessments.

20. A computer readable storage medium having program instructions embodied therewith, the program instructions executable by one or more processors to perform operations comprising:
receiving an indication of an entity from a user via a graphical user interface;
accessing data associated with the indicated entity;
generating, based on the accessed data, a plurality of risk assessments corresponding to a plurality of risk factors associated with the entity;
receiving, via the graphical user interface and from the user, a user selection of a risk factor of the plurality of risk factors;
presenting, in response to receiving the user selection of the risk factor, and via the graphical user interface:
a risk assessment, of the plurality of risk assessments, corresponding to the risk factor, and
a user evaluation option for the risk factor;
receiving, via the graphical user interface and from the user, a user interaction with the evaluation option indicating a user evaluation of the risk factor;
in response to receiving the user evaluation of the risk factor, generating a combined risk assessment based on a combination of the plurality of risk assessments and the user evaluation of the risk factor; and
causing presentation, via the graphical user interface, of the combined risk assessment.

\* \* \* \* \*